(12) United States Patent
Fujiwara et al.

(10) Patent No.: US 8,872,756 B2
(45) Date of Patent: Oct. 28, 2014

(54) DRIVER DEVICE, BACKLIGHT UNIT AND IMAGE DISPLAY DEVICE

(75) Inventors: Kohji Fujiwara, Osaka (JP); Takayuki Murai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 290 days.

(21) Appl. No.: 13/390,562

(22) PCT Filed: Mar. 10, 2010

(86) PCT No.: PCT/JP2010/053973
§ 371 (c)(1),
(2), (4) Date: Feb. 15, 2012

(87) PCT Pub. No.: WO2011/024496
PCT Pub. Date: Mar. 3, 2011

(65) Prior Publication Data
US 2012/0139823 A1 Jun. 7, 2012

(30) Foreign Application Priority Data

Aug. 31, 2009 (JP) .................................. 2009-199214

(51) Int. Cl.
*G09G 3/36* (2006.01)
*G09G 3/34* (2006.01)
*H04N 5/66* (2006.01)

(52) U.S. Cl.
CPC ............... *G09G 3/3426* (2013.01); *H04N 5/66* (2013.01); *G09G 3/3611* (2013.01); *G09G 2320/064* (2013.01)
USPC ........................................................ 345/102

(58) Field of Classification Search
USPC .................... 345/82, 95, 102, 204, 211, 212; 315/169.1, 224, 291, 294, 312, 318; 364/97.1, 97.2
See application file for complete search history.

(56) References Cited

U.S. PATENT DOCUMENTS

| 2008/0088571 A1* | 4/2008 | Lee et al. ........................ 345/102 |
| 2008/0150853 A1* | 6/2008 | Peng et al. ...................... 345/87 |
| 2009/0015541 A1* | 1/2009 | Honbo ............................ 345/102 |

(Continued)

FOREIGN PATENT DOCUMENTS

| JP | 2005-310996 A | 11/2005 |
| JP | 2007-305742 A | 11/2007 |
| JP | 2009-294282 A | 12/2009 |

OTHER PUBLICATIONS

Official Communication issued in International Patent Application No. PCT/JP2010/053973, mailed on Jun. 8, 2010.

*Primary Examiner* — Pegeman Karimi
(74) *Attorney, Agent, or Firm* — Keatinng & Bennett, LLP

(57) ABSTRACT

A backlight unit according to the present invention includes a plurality of LED drivers (5a) to (5i), an LED controller (61) that generates a control information group in which lighting control information for selected LED drivers is arranged and a cascade line that connects the LED drivers in cascade. The LED controller (61) enables the selected LED drivers (5), and feeds the control information group to the cascade line, and the enabled LED drivers (5) perform an operation (acquisition operation) of acquiring the lighting control information on itself among the control information group whereas the LED drivers (5) that are not enabled do not perform the acquisition operation. According to the present invention, it is possible to reduce the performance of unnecessary operations of the backlight unit. The present invention can be utilized in a liquid crystal display device that uses LEDs as a light source of backlight.

8 Claims, 16 Drawing Sheets

(56) References Cited

U.S. PATENT DOCUMENTS

2009/0021470 A1* 1/2009 Lee et al. .................... 345/102
2010/0066257 A1* 3/2010 Lin et al. .................... 315/161
2010/0073275 A1* 3/2010 Kim ............................ 345/102

* cited by examiner

FIG.19
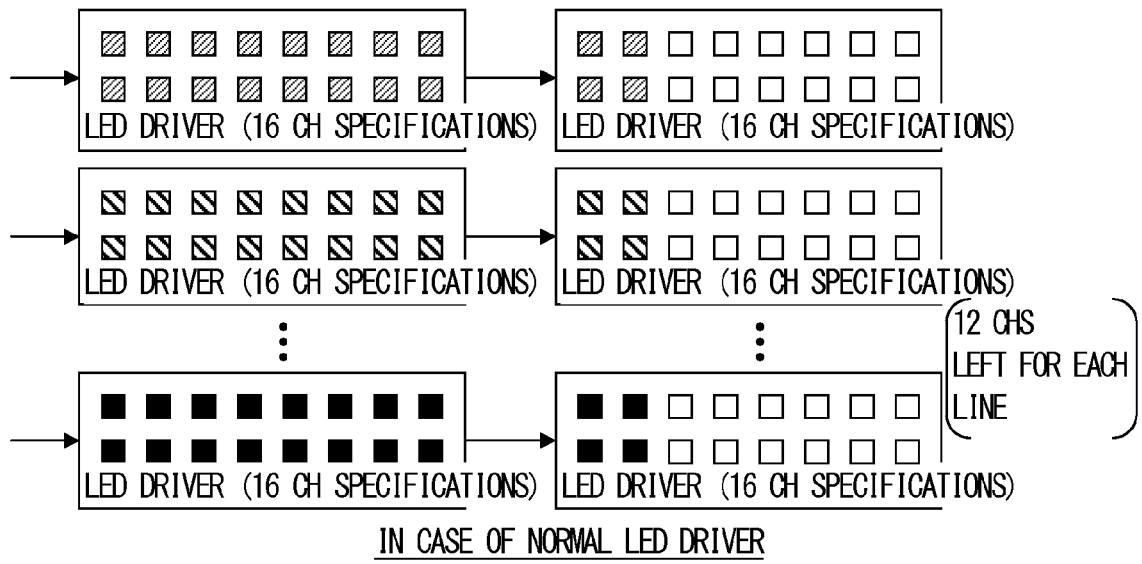
IN CASE OF NORMAL LED DRIVER
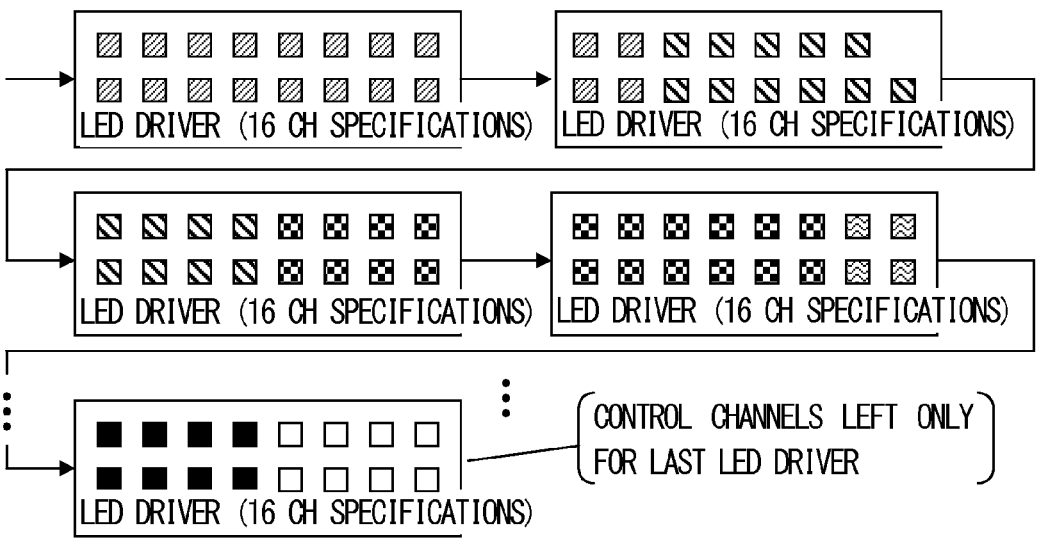
IN CASE OF LED DRIVER ACCORDING TO PRESENT EMBODIMENT
- : CONTROL CHANNELS FOR LEDS IN FIRST LINE
- : CONTROL CHANNELS FOR LEDS IN SECOND LINE
- : CONTROL CHANNELS FOR LEDS IN THIRD LINE
- : CONTROL CHANNELS FOR LEDS IN FOURTH LINE
  ⋮
- : CONTROL CHANNELS FOR LEDS IN TENTH LINE
- : LEFT CONTROL CHANNELS

DRIVER DEVICE, BACKLIGHT UNIT AND IMAGE DISPLAY DEVICE

TECHNICAL FIELD

The present invention relates to a driver device that controls a light-emitting element and to a backlight unit and an image display device that incorporate such as driver device.

BACKGROUND ART

Conventionally, as a device that displays an image, a liquid crystal display device that utilizes the properties of liquid crystal is wildly used. As an example of a backlight unit used in the liquid crystal display device or the like, a backlight unit that utilizes light-emitting diodes (LEDs) as a light source is disclosed in, for example, patent document 1.

In general, in the backlight unit using LEDs as a light source, a plurality of LEDs are connected to one or a plurality of LED drivers (driver devices). The LED driver receives lighting control information (for example, information indicating a duty ratio used when the turning on and off is controlled by PWM) from an additionally provided control device, and turns on the LED connected thereto according to the lighting control information. As the LED driver, there is also an LED driver that includes a plurality of control channels to which one or a plurality of LEDs are connected.

In the image display device including the backlight unit described above, it is likely that, for each of one or a plurality of LEDs, it is desirable to independently control the state of lighting. In one example, it is likely that, in order to enhance performance in displaying a moving image in the image display device, it is desirable to control the state of the lighting of each LED group consisting of LEDs corresponding to one section (one row or a plurality of continuous rows) in a display region.

Hence, there is an image display device which includes a plurality of LED drivers and in which each of the LED drivers receives a different piece of lighting control information. However, when the control device feeds the lighting control information, if signals carrying such information are fed in parallel to the individual LED drivers, the number of transmission lines necessary to feed the signals is increased.

Furthermore, when the total number of LED drives provided is not fixed (for example, when the number of LED drivers is likely to be increased or decreased afterward), it is difficult to provide, in the control device, an exact number of terminals for forming the transmission lines. If an excessive number of terminals are provided, part of the terminals are wasted whereas, if the number of terminals provided is low, it may be impossible to additionally increase the number of LED drivers or the like.

With respect to this problem, when the individual LED drivers are previously connected in cascade and the signals carrying the lighting control information are fed over the transmission line (cascade line) of this cascade connection, it is possible to prevent the increase in the necessary number of transmission lines. Furthermore, since, even if the total number of LED drivers provided is not fixed, the number of transmission lines is not changed, it is easy to provide an exact number of terminals for forming the transmission lines. Hence, the method of transmitting the lighting control information over the cascade line as described above may be employed.

RELATED ART DOCUMENT

Patent Document

Patent document 1: JP-A-2005-310996

DISCLOSURE OF THE INVENTION

Problems to be Solved by the Invention

As described above, the method of transmitting the lighting control information over the cascade line is used, and thus it is possible to reduce the increase in the necessary number of transmission lines, and it is easy to provide, in the control device, an exact number of terminals for forming the transmission lines for the lighting control information.

However, it is not always necessary to feed the lighting control information to all the LED drivers. In general, only when it is necessary to change the current status of control of any of the LEDs, it is simply necessary to feed the lighting control information to the LED driver corresponding to such an LED.

Hence, when the lighting control information is equally fed (is generated and then fed) to all the LED drivers, a large number of unnecessary operations are more likely to be performed. When every LED driver identifies the lighting control information for itself among pieces of information transmitted to the LED driver and receives the lighting control information, a large number of unnecessary operations are more likely to be performed. When a large number of unnecessary operations are performed, since a large amount of processing burden is placed accordingly, it is disadvantageous in terms of power consumption.

This situation is also applicable to a case where each of the LED drivers has a functional portion (a CH-specific information acquisition portion) that individually acquires a piece of lighting control information for each of the control channels of its own, and where the LED driver turns on the LED according to each piece of lighting control information acquired. In other words, since it is not always necessary to feed the lighting control information to all the CH-specific information acquisition portions, when the lighting control information is equally fed to all the CH-specific information acquisition portions, a large number of unnecessary operations are more likely to be performed.

In view of the foregoing problem, an object of the present invention is to provide a backlight unit and an image display device in which a light-emitting element is a light source of the backlight unit and which can reduce unnecessary operations even when lighting control information is transmitted over a cascade line to a driver device and a CH-specific information acquisition portion, and is also to provide a driver unit suitable for such a backlight unit.

Means for Solving the Problem

To achieve the above object, according to the present invention, there is provided a backlight unit including: a plurality of light-emitting elements; and a driver device to which one or a plurality of the light-emitting elements are connected and which turns on the connected light-emitting elements according to lighting control information obtained, the backlight unit turning on the light-emitting elements to supply backlight to a panel for displaying an image, the backlight unit further comprising: a plurality of the driver devices; a lighting control device which performs an operation (referred to a "selection operation") of selecting any of the driver devices, and generates a control information group where the lighting control information on the selected driver devices is arranged; and a cascade line over which the driver devices are connected in cascade to the lighting control portion, in which the lighting control portion enables each of the selected driver devices and then feeds, to the cascade line, the control information group and correspondence information indicating which part of the control information group corresponds to the lighting control information on each of the driver devices, and each of the enabled driver devices performs an operation (referred to an "acquisition operation") of acquiring, according to the correspondence information, the lighting control information on the enabled driver device from the control information group whereas each of the driver devices that are not enabled does not perform the acquisition operation (a first configuration).

In this configuration, the lighting control information is transmitted over the cascade line to each of the selected driver devices. Hence, as compared with the case where the lighting control information is fed in parallel to the driver devices, it is possible to minimize the increase in the number of necessary signal transmission lines. Furthermore, with the present configuration, it is possible to reduce the performance of the unnecessary operations (such as the operation of producing the lighting control information on the driver devices that are not selected and the acquisition operation by the driver devices that are not selected).

Alternatively and more specifically, in the configuration described above, the lighting control portion sequentially sets an operation mode of each of the driver devices at a first mode and a second mode, in a time period during which the first mode is set, the lighting control portion feeds, to the cascade line, enable information for enabling only the selected driver devices among driver devices, in a time period during which the second mode is set, the lighting control portion feeds, to the cascade line, the control information group and the correspondence information, in the time period during which the first mode is set, each of the driver devices enables the driver device according to the enable information fed to the cascade line, and in the time period during which the second mode is set, when each of the driver devices is enabled, each of the driver devices performs the acquisition operation whereas, when each of the driver devices is not enabled, each of the driver devices does not perform the acquisition operation (a second configuration).

Alternatively, in the configuration described above, in the time period during which the first mode is set, the lighting control portion feeds, as the enable information, to the cascade line: a clock signal having pulses (sequentially from the front thereof, that correspond to the driver devices closer to an upstream side) corresponding to the driver devices; and a data signal in which information indicating whether or not the driver devices corresponding to the pulses are enabled is arranged to synchronize with the pulses, and each of the driver devices detects a state of a part of the data signal that synchronizes with the first pulse as seen from the driver device, and performs, according to a result of the detection, an operation of enabling the driver device and an operation of cancelling the first pulse (a third configuration).

In this configuration, a simple operation using the clock signal and the data signal is performed, and thus it is possible to enable the driver devices selected by the lighting control information. The "first pulse" in the present application means the first one of the pulses produced by each mode (the first mode or the second mode).

Alternatively, in the configuration described above, in the time period during which the second mode is set, the lighting control portion feeds, as the control information group and identification information, to the cascade line: a clock signal having pulses (sequentially from the front thereof, that correspond to the driver devices closer to the upstream side) corresponding to the enabled driver devices; and a data signal in which the lighting control information on the driver devices corresponding to the pulses is arranged to synchronize with the pulses, each of the enabled driver devices performs the acquisition operation including an operation of detecting a state of a part of the data signal that synchronizes with the first pulse as seen from the enabled driver device, and an operation of cancelling the first pulse, and each of the driver devices that are not enabled performs neither the acquisition operation nor the cancel operation (a fourth configuration).

In this configuration, a simple operation using the clock signal and the data signal is performed, and thus it is possible for the enabled driver devices to acquire the lighting control information.

According to another aspect of the present invention, there is provided a backlight unit including: a plurality of light-emitting elements; and a driver device that includes: a plurality of control channels to which one or a plurality of the light-emitting elements are connected; and CH-specific information acquisition portions which are provided according to the control channels and which acquire lighting control information, and that turns on the light-emitting elements connected to the control channels according to the lighting control information obtained, the backlight unit turning on the light-emitting elements to supply backlight to a panel for displaying an image, the backlight unit further including: a lighting control portion which performs an operation (referred to a "selection operation") of selecting any of the CH-specific information acquisition portions, and generates a control information group where the lighting control information on the selected CH-specific information acquisition portions is arranged; and a cascade line over which the CH-specific information acquisition portions are connected in cascade to the lighting control portion, in which the lighting control portion enables each of the selected CH-specific information acquisition portions and then feeds, to the cascade line, the control information group and correspondence information indicating which part of the control information group corresponds to the lighting control information on each of the CH-specific information acquisition portions, and each of the enabled CH-specific information acquisition portions performs an operation (referred to an "acquisition operation") of acquiring the lighting control information on the enabled CH-specific information acquisition portion from the control information group according to the correspondence information whereas each of the CH-specific information acquisition portions that are not enabled does not perform the acquisition operation (a fifth configuration).

In this configuration, the lighting control information is transmitted over the cascade line to each of the selected CH-specific information acquisition portions. Hence, as compared with the case where the lighting control information is fed in parallel to the CH-specific information acquisition portions, it is possible to minimize the increase in the number of necessary signal transmission lines. Furthermore, with the present configuration, it is possible to reduce the performance of the unnecessary operations (such as the operation of producing the lighting control information on the CH-specific information acquisition portions that are not selected and the acquisition operation by the CH-specific information acquisition portions that are not selected).

Alternatively and more specifically, in the configuration described above, the lighting control portion sequentially sets an operation mode of each of the CH-specific information acquisition portions at a first mode and a second mode, in a time period during which the first mode is set, the lighting control portion feeds, to the cascade line, enable information for enabling only the selected CH-specific information acquisition portions among the CH-specific information acquisition portions, in a time period during which the second mode is set, the lighting control portion feeds, to the cascade line, the control information group and the correspondence information, in the time period during which the first mode is set, each of the CH-specific information acquisition portion enables the CH-specific information acquisition portion according to the enable information fed to the cascade line, and in the time period during which the second mode is set, when each of the CH-specific information acquisition portions is enabled, the CH-specific information acquisition portion performs the acquisition operation whereas, when each of the CH-specific information acquisition portions is not enabled, the CH-specific information acquisition portion does not perform the acquisition operation (a sixth configuration).

In this configuration, in the time period during which the first mode is set, the lighting control portion feeds, as the enable information, to the cascade line: a clock signal having pulses (sequentially from the front thereof, that correspond to the CH-specific information acquisition portions closer to an upstream side) corresponding to the CH-specific information acquisition portions; and a data signal in which information indicating whether or not the CH-specific information acquisition portions corresponding to the pulses are enabled is arranged to synchronize with the pulses, and each of the CH-specific information acquisition portions detects a state of a part of the data signal that synchronizes with the first pulse as seen from the CH-specific information acquisition portion, and performs, according to a result of the detection, an operation of enabling the CH-specific information acquisition portion and an operation of cancelling the first pulse (a seventh configuration).

In this configuration, a simple operation using the clock signal and the data signal is performed, and thus it is possible to enable the CH-specific information acquisition portions selected by the lighting control portion.

Alternatively, in the configuration described above, in the time period during which the second mode is set, the lighting control portion feeds, as the control information group and identification information, to the cascade line: a clock signal having pulses (sequentially from the front thereof, that correspond to the CH-specific information acquisition portions closer to the upstream side) corresponding to the enabled CH-specific information acquisition portions; and a data signal in which the lighting control information on the CH-specific information acquisition portions corresponding to the pulses is arranged to synchronize with the pulses, each of the enabled CH-specific information acquisition portions performs the acquisition operation including an operation of detecting a state of a part of the data signal that synchronizes with the first pulse as seen from the enabled CH-specific information acquisition portion, and an operation of cancelling the first pulse, and each of the CH-specific information acquisition portions that are not enabled performs neither the acquisition operation nor the cancel operation (an eighth configuration).

In this configuration, a simple operation using the clock signal and the data signal is performed, and thus it is possible for the enabled CH-specific information acquisition portions to acquire the lighting control information.

According to the present invention, there is provided an image display device including: the backlight unit configured as described above; a panel unit that includes the panel and that uses the backlight to display an image corresponding to received image data on the panel; and an image data supply portion that acquires the image data and that supplies the image data to the backlight unit and the panel unit, in which the lighting control portion performs the selection operation based on the image data received from the data supply portion (a ninth configuration).

With this configuration, it is possible to acquire advantages in the backlight unit of the configuration described above and associate the state of the backlight with the image displayed on the panel.

According to the present invention, there is provided a driver device to which one or a plurality of light-emitting elements are connected and which turns on the connected light-emitting elements according to lighting control information obtained, the driver device including: a mode setting portion which sets, according to the obtained information, an operation mode of the driver device at a first mode or a second mode; and a cascade connection portion which connects the driver device to an external device in cascade, which receives a clock signal and a data signal from an upstream side and which feeds these signals to a downstream side, in which, in a time period during which the first mode is set, the driver device detects a state of a part of the data signal that synchronizes with the first pulse as seen from the driver device, and performs, according to a result of the detection, an operation of enabling the driver device and an operation of cancelling the first pulse, and in a time period during which the second mode is set, when the driver device is enabled, the enabled driver device performs an acquisition operation of detecting a state of a part of the data signal that synchronizes with the first pulse as seen from the enabled driver device and of acquiring the lighting control information on the enabled driver device, and an operation of cancelling the first pulse whereas, when the driver device is not enabled, the driver devices performs neither the acquisition operation nor the cancel operation (a tenth configuration).

With this configuration, it is possible to apply the driver device to part of the backlight unit of the third or fourth configuration described above, and easily provide the backlight unit.

According to another aspect of the present invention, there is provided a driver device that includes: a plurality of control channels to which one or a plurality of light-emitting elements are connected; and CH-specific information acquisition portions which are provided according to the control channels and which acquire lighting control information, and that turns on the light-emitting elements connected to the control channels according to the lighting control information obtained, the driver device including: a mode setting portion which sets, according to the obtained information, an operation mode of the driver device at a first mode or a second mode; and a cascade connection portion which connects the driver device to an external device in cascade, which receives a clock signal and a data signal from an upstream side and which feeds these signals to a downstream side, in which, in a time period during which a first mode is set, each of the CH-specific information acquisition portions performs an operation of detecting a state of a part of the data signal that synchronizes with the first pulse as seen from the CH-specific information acquisition portion and of enabling, according to a result of the detection, the CH-specific information acquisition portion and an operation of cancelling the first pulse, and in a time period during which a second mode is set, when the each of CH-specific information acquisition portions is enabled, the enabled CH-specific information acquisition portion performs an acquisition operation of detecting a state of a part of the data signal that synchronizes with the first pulse as seen from the enabled CH-specific information acquisition portion and of acquiring the lighting control information on the enabled CH-specific information acquisition portion and an operation of cancelling the first pulse whereas, when each of the CH-specific information acquisition portions is not enabled, the CH-specific information acquisition portion performs neither the acquisition operation nor the cancel operation (an eleventh configuration).

With this configuration, it is possible to apply the driver device to part of the backlight unit of the seventh or eighth configuration described above, and easily provide the backlight unit.

In the driver device and the backlight unit configured as described above, the light-emitting elements may be LEDs.

Advantages of the Invention

As described above, in the backlight unit according to the present invention, the lighting control information is transmitted over the cascade line to the selected driver devices or the like (the driver devices or the CH-specific information acquisition portions). Hence, as compared with the case where the lighting control information is fed in parallel to the LED drivers or the like, it is possible to minimize, for example, the increase in the number of necessary signal transmission lines. Furthermore, with this configuration, it is also possible to reduce the performance of the unnecessary operations (such as the operation of producing the lighting control information on the LED drivers or the like that are not selected and the acquisition operation by the LED drivers or the like that are not selected).

BRIEF DESCRIPTION OF DRAWINGS

[FIG. 19] A diagram illustrating the remainder of control channels.

MODE FOR CARRYING OUT THE INVENTION

An embodiment of the present invention will be described below using a first example and a second example.

FIRST EXAMPLE

The first example of the present invention will first be described below using a television broadcast receiver (one aspect of an image display device).

Figure 1:
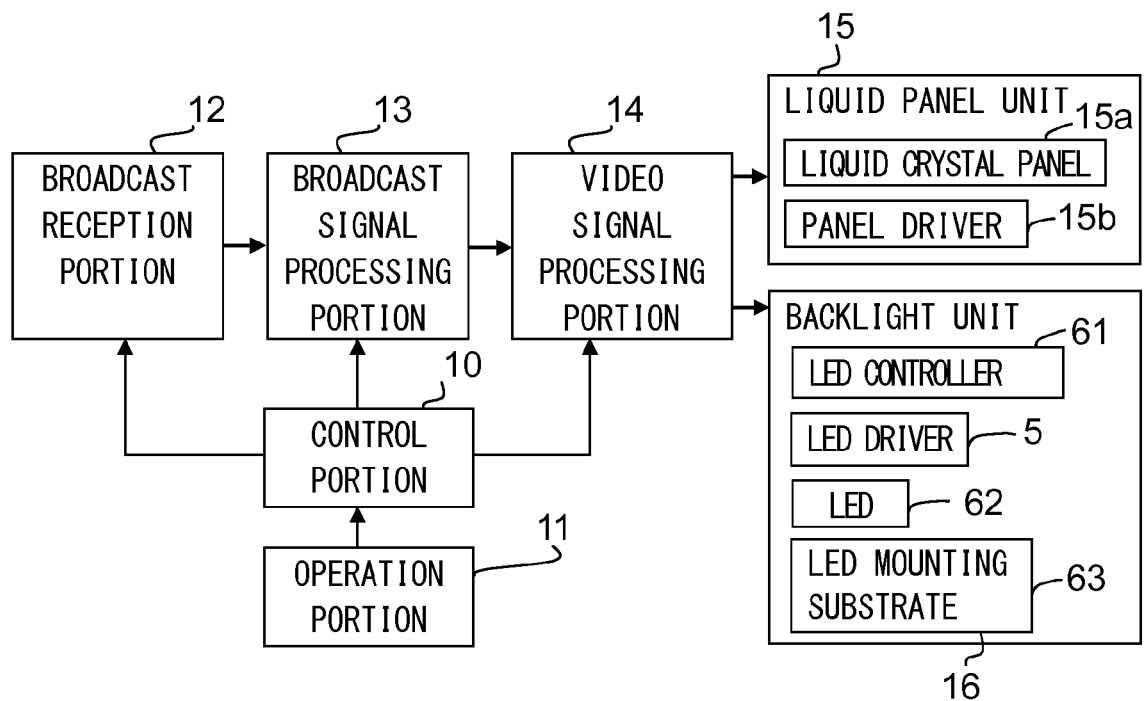
[FIG. 1] A diagram showing the configuration of a television broadcast receiver according to an embodiment of the present invention.

FIG. 1 is a schematic diagram showing the configuration of the television broadcast receiver. As shown in this figure, the television broadcast receiver 1 includes a control portion 10, an operation portion 11, a broadcast reception portion 12, a broadcast signal processing portion 13, a video signal processing portion 14, a liquid crystal panel unit 15 and a backlight unit 16.

The control portion 10 controls the individual portions of the television broadcast receiver 1, and makes them perform various types of processing necessary to achieve the functions (such as of displaying images of television broadcast) of the television broadcast receiver 1. The operation portion 11 includes a switch that is operated by a user, and transmits the details of the operation to the control portion 10. Thus, it is possible to reflect the intention of the user on the various operations of the television broadcast receiver 1.

The broadcast reception portion 12 includes an antenna and a tuner device, and continuously receives broadcast signals transmitted from a television broadcast station. The broadcast channel to be selected and the like are controlled by the control portion 10. The received broadcast signal is fed to the broadcast signal processing portion 13.

The broadcast signal processing portion 13 extracts a video signal and a sound signal from the broadcast signal, feeds the video signal to the video signal processing portion 14 and feeds the sound signal to an unillustrated speaker device (a device for producing sound based on the sound signal).

The video signal processing portion 14 performs necessary processing (for example, processing for decompression and processing for correcting colors) on the video signal received from the preceding stage side. The video signal on which these types of processing have been performed is fed to the liquid crystal panel unit 15 and the backlight unit 16. As with the common form of a video signal, the video signal is formed with: brightness signals of RGB (red, green and blue) pixels; a synchronization signal for determining the timing of the display of an image (scanning); a clock signal (referred to as a "display clock signal" so that it is distinguished from a "clock signal" to be described later); and the like.

In this way, data on the images of individual frames of the video (data for identifying the details of the display of the images, the timing of the display and the like) is continuously fed to the liquid crystal panel unit 15 and the backlight unit 16.

The liquid crystal panel unit 15 includes a liquid crystal panel 15a and a panel driver 15b. The liquid crystal panel 15a is configured similar to a common liquid crystal display panel that includes a plurality of pixels (having electrodes arranged opposite each other with liquid crystal sandwiched therebetween) and the color filters of RGB corresponding to the individual pixels. Thus, in the liquid crystal panel 15a, a voltage that is applied to the electrode of each of the pixels is adjusted, and thus the transmittance of backlight that is supplied is adjusted on an individual pixel basis.

Figure 2:
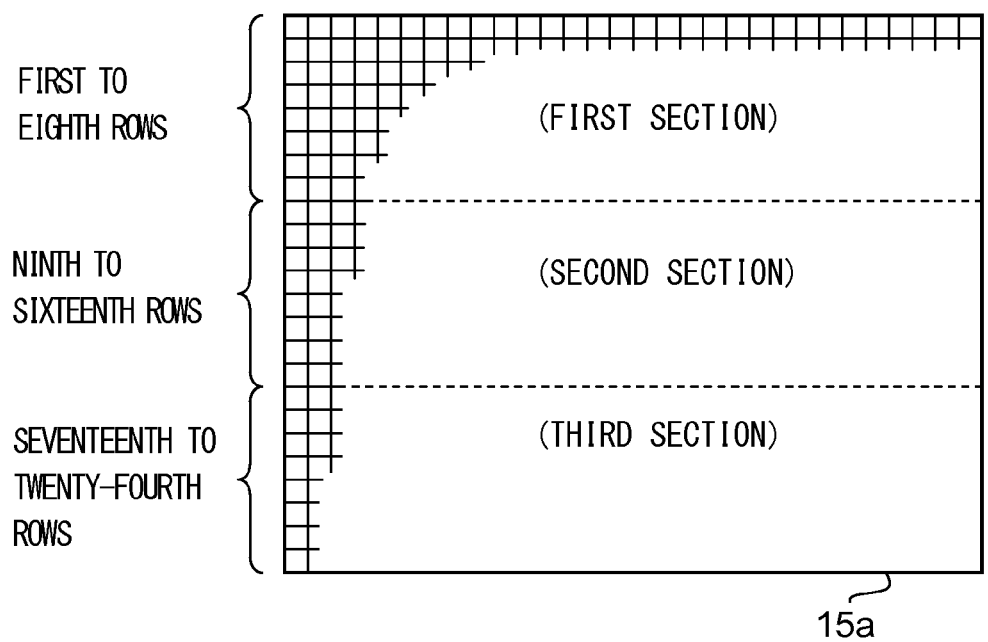
[FIG. 2] A diagram illustrating a display region of a liquid crystal panel according to the embodiment of the present invention.

As shown in FIG. 2, the display region of an image on the liquid crystal panel 15a is formed with pixels of twenty four rows. As likewise shown in FIG. 2, the display region is formed with three sections (the first to third sections). The "section" in the present patent application is defined, for convenience, to refer to each of a plurality of regions into which the display region is divided in the direction of vertical scanning (in the present example, the direction of the rows).

In the present example, the "first section" is composed of pixels within the range of the first to eighth rows as counted from above, the "second section" is composed of pixels within the range of the ninth to sixteenth rows as counted from above and the "third section" is composed of pixels within the range of the seventeenth to twenty-fourth rows as counted from above.

Although details are described later, each of the sections is made to correspond to LEDs (that is, LEDs that apply backlight to its part) that are arranged on its back side. Each of the sections may include either a plurality of rows or only one row.

Based on the video signal (image data) received from the video signal processing portion 14, the panel driver 15b adjusts the voltage of each pixel electrode in the liquid crystal panel 15a. More specifically, after data on the image of a new frame is obtained, the panel driver 15b sequentially sets, according to the data on the image, the voltages of individual pixel electrodes in each row (in the present example, sequentially from the top row) in a predetermined direction (in the present example, from the left side to the right side) (in the present patent application, this type of operation is referred to as "scanning").

In this way, when the backlight is applied through the back side of the liquid crystal panel 15a, an image is displayed in the display region on the liquid crystal panel 15a. With particular attention given to the sections of the display region, the scanning of each frame starts with the individual rows of the "first section", then the scanning is performed on the individual rows of the "second section" and the scanning of the individual rows of the "third section" is finished, with the result that the scanning of each frame is completed.

Figure 3:
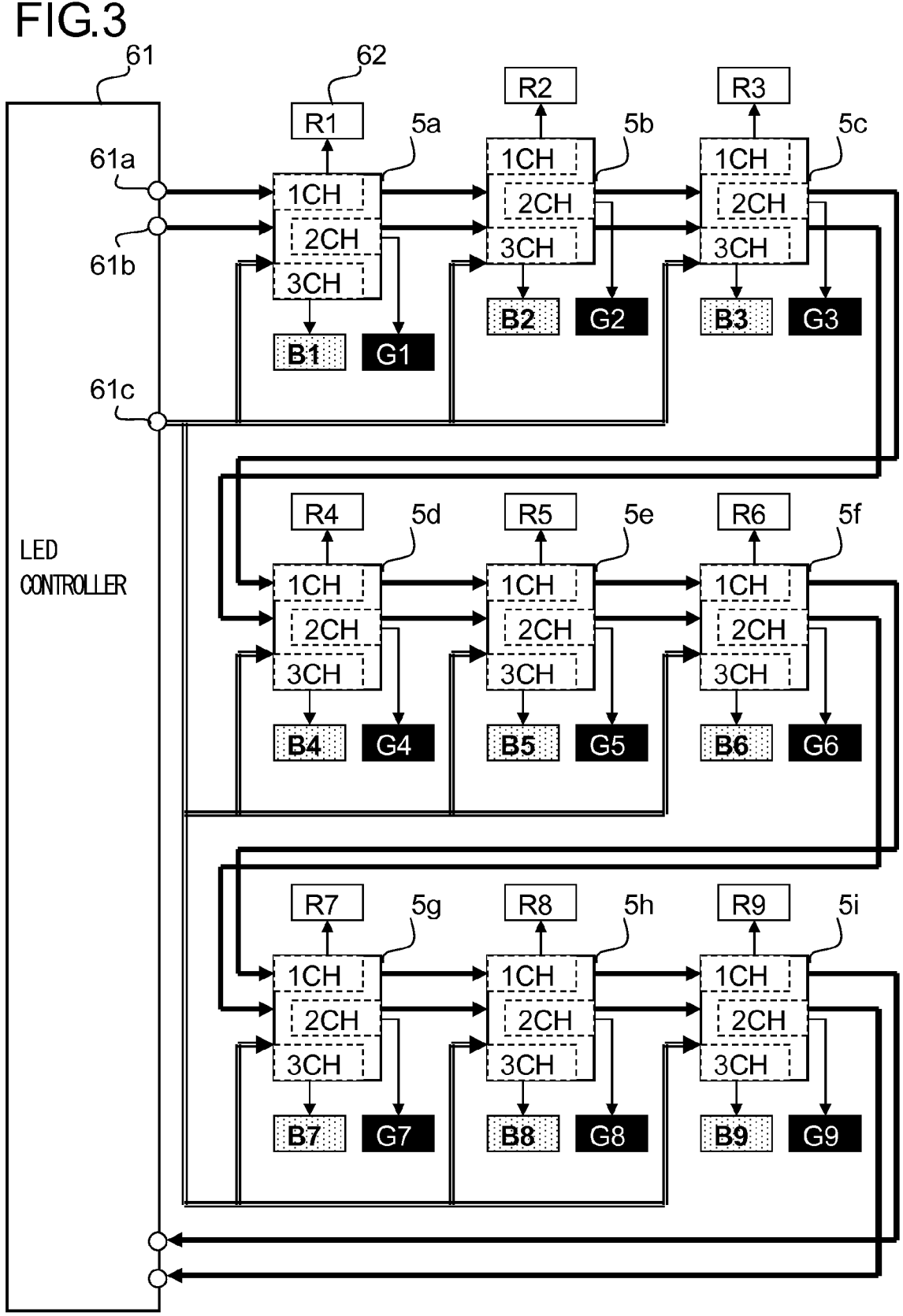
[FIG. 3] A diagram showing the configuration of a backlight unit according to a first example of the present invention.

The backlight unit 16 includes an LED controller 61, LED drivers 5 (as shown in FIG. 3, a total of nine LED drivers, namely, LED drivers 5a to 5i), LEDs 62 (as shown in FIG. 3, a total of twenty seven LEDs, namely, LEDs R1 to R9, G1 to G9 and B1 to B9) and an LED mounting substrate 63.

Based on the video signal (image data) received from the video signal processing portion 14, the LED controller 61 generates lighting control information for controlling the lighting of the LEDs 62. In the present example, the lighting control information is, for example, the information of 12 bits for determining the details (a duty ratio, a frequency and a phase or part of them) of a PWM signal related to the turning on and off of the LEDs 62. Although details are described later, the LED controller 61 feeds the clock signal (a signal having a pulse), a data signal (a signal carrying various types of information) and a mode signal (a signal for determining the state of the operation of each of the LED drivers 5), and thereby feeds the lighting control information to a previously selected LED driver 5. The mode signal is a signal that is either high or low and that is continuously fed, and the state of the operation of each of the LED drivers 5 is determined according to which state the mode signal is in.

The state of the connection of the individual portions of the backlight unit 16 is shown in FIG. 3. As shown in FIG. 3, the LED controller 61 includes terminals (61a to 61c) that allow various signals to be fed to the LED drivers 5. The clock signal, the data signal and the mode signal are fed through the terminal 61a, the terminal 61b and the terminal 61c, respectively.

The LED drivers 5 are connected to the terminal 61a in cascade (are connected in series, from the side close to the terminal 61a, in the following order: the LED driver 5a, the LED driver 5b, ... and the LED driver 5i). A signal transmission line that is formed with this cascade connection is hereinafter referred to as a "first cascade line." The first cascade line allows the clock signal fed through the terminal 61a to reach each of the LED drivers 5.

In addition to the first cascade line, the LED drivers 5 are likewise connected to the terminal 61b in cascade (are connected in series, from the side close to the terminal 61b, in the following order: the LED driver 5a, the LED driver 5b, ... and the LED driver 5i). A signal transmission line that is formed with this cascade connection is hereinafter referred to as a "second cascade line." The second cascade line allows the data signal fed through the terminal 61b to reach each of the LED drivers 5.

In the present patent application, the side of the cascade line close to the feeder of the signal (here, the LED controller 61) is referred to as an "upstream side", and the side far therefrom is referred to as a "downstream side." In each of the cascade lines, a signal is transmitted from the upstream side to the downstream side. The LED drivers 5 are directly connected to the terminal 61c, and the mode signal is fed to the LED drivers 5.

The LED driver 5 has three control channels (1 to 3 chs); one or a plurality of LEDs are connected to each of the three control channels. The LED driver 5 turns on the LEDs 62 connected to the individual control channels according to the lighting control information that is set previously and validly for such an LED driver 5 (in other words, the lighting control information that is stored in a data latch portion 56, which will be described later). Here, the configuration of the LED driver 5 will be described below.

Figure 4:
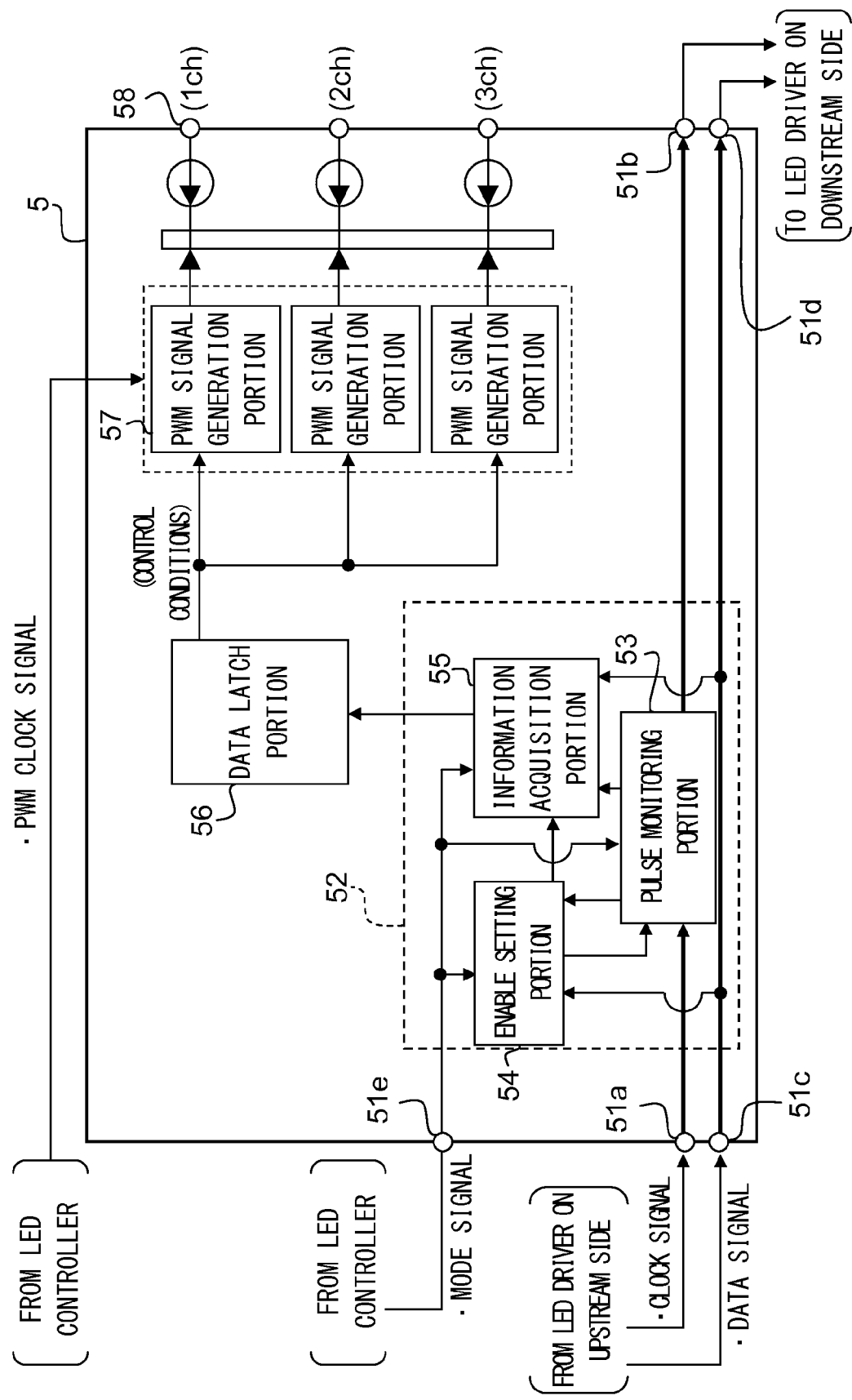
[FIG. 4] A diagram showing the configuration of an LED driver according to the first example of the present invention.

FIG. 4 is a diagram showing the configuration of the LED driver 5. As shown in this figure, the LED driver 5 includes terminals (51a to 51e) that are used for connection to other devices, an information processing portion 52, a pulse monitoring portion 53, an enable setting portion 54, an information acquisition portion 55, the data latch portion 56, PWM signal generation portions 57 and LED connection terminals 58. The portions subsequent to the data latch portion 56 are provided according to the control channels of 1 to 3 chs such that the portions for three systems are provided.

The terminal 51a is a terminal through which the clock signal is received from the outside. The terminal 51a is connected through the pulse monitoring portion 53 to the terminal 51b. Thus, the LED driver 5 receives the clock signal and then can transfer it to the outside through the terminal 51b.

In the present example, these terminals (51a and 51b) are used for the formation of the first cascade line described previously. Specifically, the terminal 51a is connected to the terminal 51b of the LED driver 5 that is arranged closest to the upstream side. When the LED controller 61 is arranged closest to the upstream side, the terminal 51a is connected to the terminal 61a. The terminal 51b of the LED driver 5 at the most downstream position is connected to the LED controller 61 such that the signal is fed back.

The terminal 51c is a terminal through which the data signal is received from the outside. The terminal 51c is connected to the terminal 51d. Thus, the LED driver 5 receives the data signal, and then can transmit it to the outside through the terminal 51d.

In the present example, these terminals (51c and 51d) are used for the formation of the second cascade line described previously. Specifically, the terminal 51c is connected to the terminal 51d of the LED driver 5 that is arranged closest to the upstream side. When the LED controller 61 is arranged closest to the upstream side, the terminal 51c is connected to the terminal 61b. The terminal 51d of the LED driver 5 at the most downstream position is connected to the LED controller 61 such that the signal is fed back.

The terminal 51e is a terminal through which the mode signal is received from the outside. The terminal 51e is connected to the information processing portion 52. In the present example, the terminal 51e is connected to the terminal 61c of the LED controller 61. Thus, the information processing portion 52 (the portions 53 to 55 of the information processing portion 52) can receive the mode signal from the LED controller 61.

The information processing portion 52 is formed with the pulse monitoring portion 53, the enable setting portion 54 and the information acquisition portion 55, and processes information fed from the outside (in the present example, from the LED controller 61).

The pulse monitoring portion 53 is arranged between the terminal 51a and the terminal 51b (part of the first cascade line), and monitors the clock signal transmitted from the upstream side. Then, each time the state of the mode signal is switched, the pulse monitoring portion 53 detects the first pulse (the pulse that is first reached after the state of the mode signal has been switched) of the clock signal, and notifies the enable setting portion 54 and the information acquisition portion 55 of the fact that the pulse has been reached.

The pulse monitoring portion 53 transfers the clock signal transmitted from the upstream side to the downstream side; here, the pulse monitoring portion 53 performs processing (hereinafter referred to as "cancel processing") for cancelling (removing) the first pulse.

In the cancel processing, each time the pulses included in the clock signal pass through one of the LED drivers 5 (the pulse monitoring portion 53), the pulses are cancelled sequentially from the front thereof one by one. However, as will be described later, only when the mode signal is low and is not enabled, the pulse monitoring portion 53 passes the transmitted clock signal to the downstream side without the transmitted clock signal being processed, and does not perform the cancel processing.

The pulse monitoring portion 53 includes a switch that switches the continuity and the discontinuity of the first cascade line. When the mode signal is switched, the pulse monitoring portion 53 brings the switch into the discontinuity state whereas, when the falling edge of the first pulse is detected, the pulse monitoring portion 53 brings the switch into the continuity state. In this way, the cancel processing described above is achieved. This is one example; another method may be employed.

The enable setting portion 54 sets enabled the LED driver 5 corresponding to itself according to the transmitted enable information (at the state where the lighting control information can be acquired). The information acquisition portion 55 acquires the lighting control information transmitted from the upstream side, and feeds it to the data latch portion 56.

The data latch portion 56 stores (latches) the lighting control information. The lighting control information is reflected on the state of the lighting of the LED (that is, is set valid for the LED driver 5) by being stored in the data latch portion 56. When the data latch portion 56 receives the lighting control information from the information acquisition portion 55, the data latch portion 56 updates the currently stored lighting control information to the received lighting control information.

The PWM signal generation portion 57 uses a PWM clock signal transmitted from the LED controller 61, generates, according to the validly set lighting control information, the PWM signal (the signal that alternates between the high level and the low level at a predetermined duty ratio) and outputs it to the subsequent stage side of the corresponding system. In the present example, the PWM signal is generated according to a duty ratio indicated by the validly set lighting control information (such that a ratio between a time period of the high level and a time period of the low level is equal to the duty ratio). When the validly set lighting control information is updated, the generation of a PWM signal corresponding to a new piece of lighting control information is started after the update.

In the time period during which the PWM signal is high, a predetermined amount of current is passed through the LED connected to the LED connection terminal 58 of the corresponding control channel, and the LED is turned on (is lighted). On the other hand, in the time period during which the PWM signal is low, such current is not passed, and the LED connected to the LED connection terminal 58 of the corresponding control channel is turned off.

Within the rating of the LED driver 5, one or a plurality of LEDs can be connected to each of the LED connection terminals 58. The number of control channels, the system of various signals and the like are not limited to what have been described above; various forms thereof can be employed. Although it is assumed that one LED driver 5 is formed as one IC chip, the LED driver 5 may be formed otherwise.

With reference back to FIG. 1, the LEDs 62 are formed as, for example, LED chips, are arranged on the mounting surface of the LED mounting substrate 63 and function as the light source of the backlight for the liquid crystal panel 15a. The LED mounting substrate 63 is attached to the back side of the liquid crystal panel 15a such that its mounting surface faces the liquid crystal panel 15a.

As shown in FIG. 3, as the LEDs 62, the LED that emits red light (represented by the letter "R" in the figure), the LED that emits green light (represented by the letter "G" in the figure) and the LED that emits blue light (represented by the letter "B" in the figure) are provided. As likewise shown in FIG. 3, each of the LEDs 62 is connected to any one of the control channels in any one of the LED drivers 5. For example, the LED 62 that emits red light and that is represented by "R1" is connected to the 1 CH of the LED driver 5a.

Figure 5:
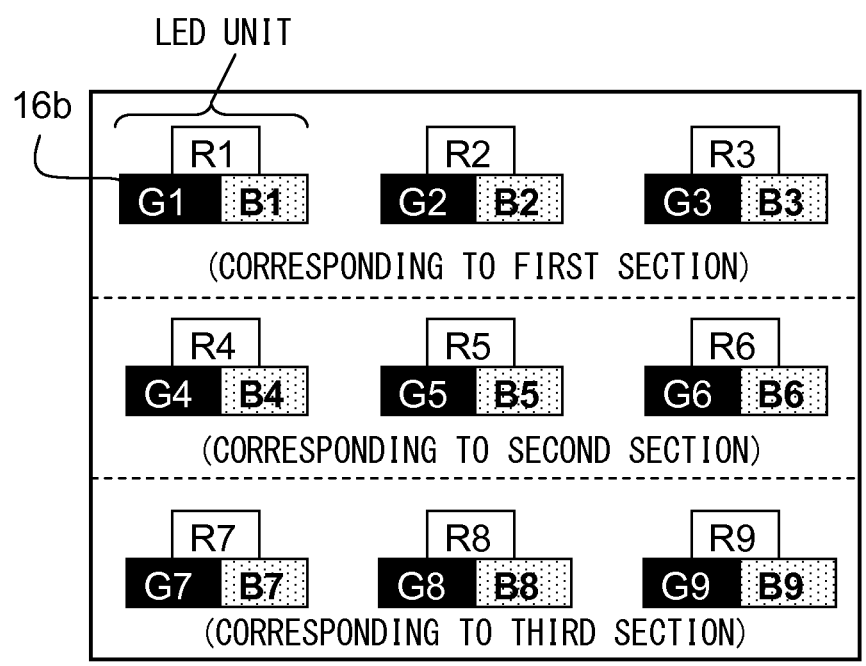
[FIG. 5] A diagram illustrating the arrangement of LEDs according to the first example of the present invention.

As shown in FIG. 5, the LEDs 62 are arranged on the LED mounting substrate 63 such that an LED unit consisting of LEDs which individually emit R (red) light, G (green) light and B (blue) light is formed. Each LED unit emits the light of RGB colors and thereby emits substantially white light as a whole.

The LED units are spaced a substantially equal distance apart so as to correspond to the sections described previously (the first to third sections) (specifically, such that, when seen in the direction of the display of the image, each LED unit covers any one of the sections). In this way, when the state of the lighting of the LED unit is changed, this change mainly affects the state of the display of the image in the section corresponding to such an LED unit.

Figure 6:
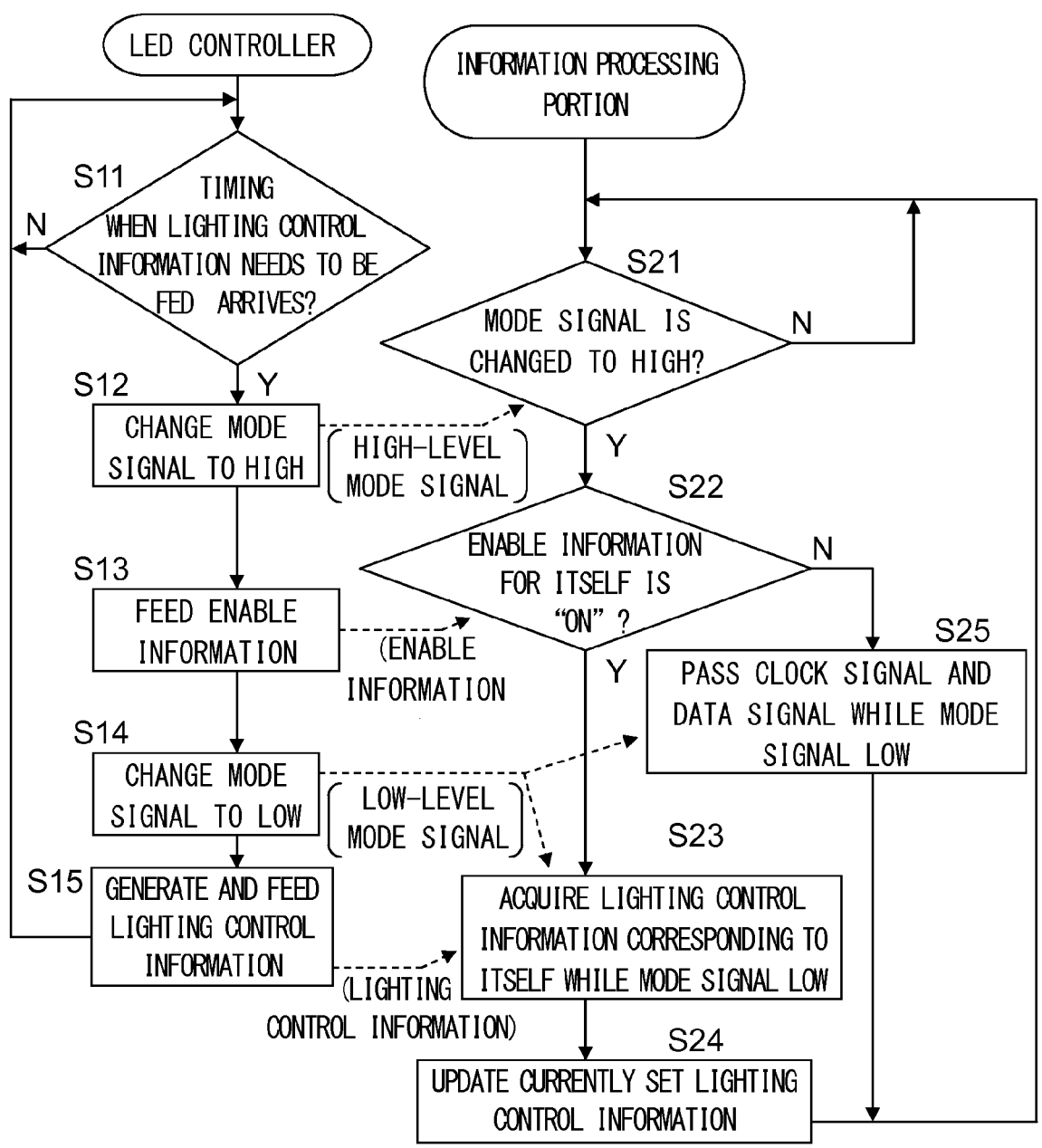
[FIG. 6] A flowchart of the operation of an LED controller and the like according to the first example of the present invention.

The details of the operation of the LED controller 61 and the details of the operation of the information processing portion 52 of each of the LED drivers 5 will now be described with reference to the flowchart shown in FIG. 6. Information indicating which one of the LEDs 62 is connected (corresponds) to each of the LED drivers 5 and information indicating to which one of the sections each of the LEDs 62 corresponds are previously recorded in the LED controller 61.

The details of the operation of the LED controller 61 will first be described. The LED controller 61 monitors a timing when the LED controller 61 needs to feed the lighting control information to any one of the LED drivers 5 (step S11). The method of determining a timing when the lighting control information needs to be fed will be described in more detail in a section titled "timing when the lighting control information is fed and the like", which will be described later. At this point, the LED controller 61 feeds a low level mode signal.

Then, if the arrival of the timing is detected (Y in step S11), the LED controller 61 sets high the mode signal being fed so as to switch the state of the operation of each of the information processing portions 52 (step S12).

Thereafter, the LED controller 61 selects, among the LED drivers 5, the LED driver 5 in which the validly set lighting control information needs to be updated, and feeds the enable information for enabling the selected LED driver 5 (step S13). More specifically, the LED controller 61 feeds: a clock signal which has pulses equal in number to the LED drivers 5 (the nth pulse as counted from the front corresponds to the nth LED driver 5 as counted from the upstream side); and a data signal which is arranged such that the enable information (information indicating whether or not the LED driver 5 is enabled) on the LED driver 5 corresponding to each of the pulses is synchronized with the pulse.

The data signal here is either high or low; if the data signal is high, it indicates an "on" state (that it is enabled) whereas, if the data signal is low, it indicates an "off" state (that the LED driver 5 is not enabled).

Figure 7:
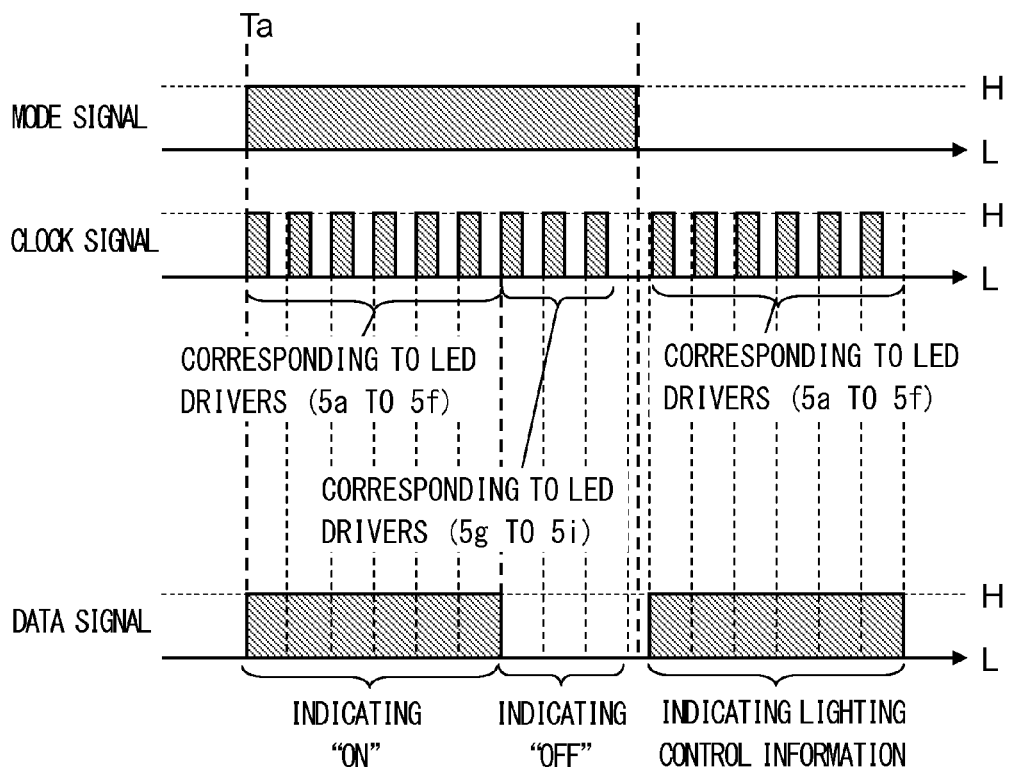
[FIG. 7] A timing chart of each signal in the first example of the present invention.

In one example, when it is assumed that the enable information for the first and second sections is "on", and that the enable information for the third section is "off", a timing chart on the clock signal and the data signal is shown in FIG. 7 (in a time period during which the mode signal is high). As shown in this figure, the clock signal has nine pulses (corresponding in number to LED drivers 5), and part of the data signal that corresponds to the LED drivers (5a to 5f) corresponding to the first and second sections is high, and the part of the data signal that corresponds to the other LED drivers (5g to 5i) is low.

After the enable information is fed, the LED controller 61 sets low the mode signal output from the terminal 61c so as to switch the state of the operation of each of the information processing portions 52 (step S14). Then, the LED controller 61 generates and feeds the lighting control information to only the LED drivers 5 that have been enabled (in which the enable information is turned on) (step S15).

More specifically, the LED controller 61 feeds: a clock signal which has pulses equal in number to the enabled LED drivers 5 (the nth pulse as counted from the front corresponds to the nth enabled LED driver 5 as counted from the upstream side); and a data signal which is arranged such that the lighting control information on the LED driver 5 corresponding to each of the pulses is synchronized with the pulse.

It can also be considered that the data signal in this case indicates information (control information group) in which the lighting control information for the enabled LED drivers 5 is arranged, and that clock signal indicates information (correspondence information) indicating which part of the control information group corresponds to the lighting control information on each of the LED drivers 5.

A timing chart on the clock signal and the data signal here is shown in FIG. 7 (in the time period during which the mode signal is low). As shown in this figure, the clock signal has six pulses (corresponding in number to the enabled LED drivers 5), and part of the data signal that synchronizes with each of the pulses indicates the lighting control information corresponding to the pulse.

After the lighting control information is fed, the operation of the LED controller 61 is returned to step S11, and then the same operations are repeated. Specifically, each time a timing when the lighting control information that is set validly for any one of the LED drivers 5 needs to be updated arrives, the operations in step S12 to S15 are repeated The details of the operation of the information processing portion 52 will now be described. The information processing portion 52 monitors a timing when the mode signal changes from low to high (step S21).

If the information processing portion 52 detects that the mode signal has changed to high (Y in step S21), the information processing portion 52 monitors the clock signal and the data signal transmitted from the upstream side, and performs an operation for setting enabled the LED driver 5 of itself according to the enable information (step S22). More specifically, the enable setting portion 54 detects the state of a part (a notification of the timing when the first pulse arrives is provided by the pulse monitoring portion 53) that synchronizes with the first pulse in the data signal as seen from itself.

As described above, the data signal that synchronizes with the nth pulse in the clock signal corresponds to the nth LED driver 5 as counted from the upstream side. Then, each time the clock signal passes through one of the LED drivers 5, the first pulse is cancelled. Hence, in each of the LED drivers 5, the part that synchronizes with the first pulse in the data signal as seen from itself represents the enable information corresponding to the LED driver 5 of itself.

Figure 8:
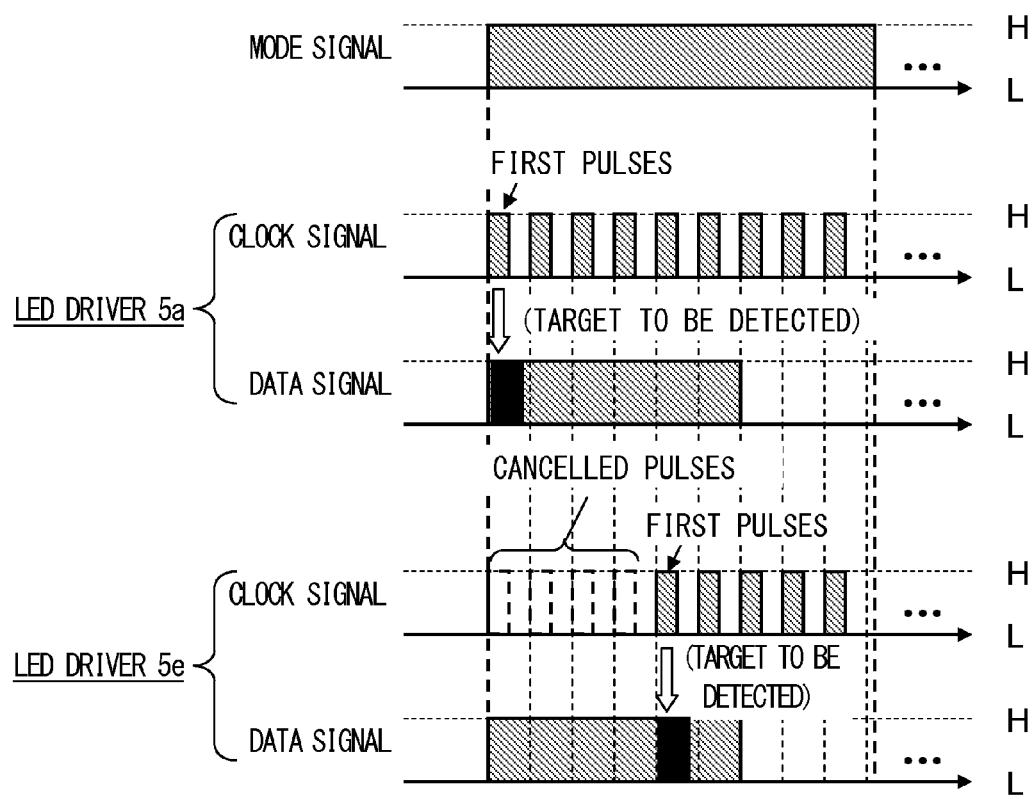
[FIG. 8] Another timing chart of each signal in the first example of the present invention.

For example, as shown in FIG. 8, as seem from the LED driver 5a (the first one from the upstream side), the first pulse in the clock signal is the "first pulse", and part of the data signal that synchronizes with the pulse indicates the enable information corresponding to the LED driver 5a. On the other hand, since, as seem from the LED driver 5e (the fifth one from the upstream side), the first to fourth pulses in the clock signal have already been cancelled, the fifth pulse is the "first pulse", and part of the data signal that synchronizes with the pulse indicates the enable information corresponding to the LED driver 5e.

Then, the enable setting portion 54 records the result of the detection until the mode signal is subsequently changed from low to high. Notification of the recorded information is provided to the pulse monitoring portion 53 and the information acquisition portion 55. In this way, if the enable information is "on", the LED driver 5 is set enabled.

Then, if, when the mode signal is changed from high to low, it is not enabled (N in step S22), the information processing portion 52 of the LED driver 5 passes the clock signal and the data signal while the mode signal is being low (step S23).

Specifically, although, while the mode signal is being low, the clock signal and the data signal for transmitting the lighting control information are transmitted (see step S15), the information processing portion 52 passes these signals to the downstream side without any processing (including the cancel processing described previously) being performed.

On the other hand, if, when the mode signal is changed from high to low, it is enabled (Y in step S22), the information processing portion 52 of the LED driver 5 monitors the clock signal and the data signal transmitted from the upstream side, and performs an operation for acquiring the lighting control information corresponding to itself (step S24).

More specifically, the information acquisition portion 55 detects the state of the part (a notification of the timing when the first pulse arrives is provided by the pulse monitoring portion 53) that synchronizes with the first pulse in the data signal as seen from itself.

As described previously, the data signal that synchronizes with the nth pulse in the clock signal corresponds to the nth enabled information processing portion 52 as counted from the upstream side. Then, each time the clock signal passes through one of the enabled LED drivers 5, the first pulse is cancelled; on the other hand, this cancellation is not performed as a result of the clock signal passing through the enabled LED driver 5. Hence, in the information processing portion 52, the part of the data signal that synchronizes with the first pulse as seen from itself indicates the lighting control information corresponding to itself.

The information acquisition portion 55 performs the detection described above, and thereby acquires the lighting control information corresponding to itself. Then, the information acquisition portion 55 records the acquired lighting control information in the data latch portion 56 (updates the details recorded) and updates the validly set lighting control information (step S25). Thus, each of the PWM signal generation portions 57 thereafter generates the PWM signal according to the updated lighting control information.

By performing a series of operations described above, the LED controller 61 generates and feeds the lighting control information, and can thereby control the lighting of the LED 62 connected to each of the LED drivers 5. Here, the target on which the generation and the feeding of the lighting control information are performed is only the enabled information processing portions 52. Furthermore, the information processing portion 52 that performs an operation for acquiring the lighting control information is only the information processing portion 52 that is set enabled. As described above, in the backlight unit 16 of the present example, unnecessary operations on the generation, the feeding and the acquisition of the lighting control information are minimized The feeding of the enable information and the lighting control information may be performed otherwise. With respect to the feeding of the enable information, for example, the LED controller 61 may feed, to one cascade line, information obtained by adding, to each piece of the enable information, address information (information that is used for distinguishing one of the information processing portions 52 from another and that is previously recorded in the LED controller 61). In this case, each of the information processing portions 52 can identify and acquire, from the address information, the enable information corresponding to itself. In this case, the cancel processing described previously is not needed. With respect to the feeding of the lighting control information, for example, the LED controller 61 may feed, to one cascade line, information obtained by adding the address information to each piece of the enable information. In this case, each of the information processing portions 52 can identify and acquire, from the address information, the lighting control information corresponding to itself. In this case, the cancel processing described previously is not needed, either.

SECOND EXAMPLE

The second example of the present invention will now be described below using a television broadcast receiver (one aspect of an image display device). The present example is basically the same as the first example except the configuration of the backlight unit 16. Hence, in the present example, the repetition of the description may be omitted. The present example differs from the first example in that the lighting control information is set for each of the control channels.

The backlight unit 16 of the present example includes the LED controller 61, LED drivers 5 (a total of three LED drivers, namely, LED drivers 5s to 5u), LEDs 62 (a total of twenty seven LEDs, namely, the LEDs R1 to R9, G1 to G9 and B1 to B9) and the LED mounting substrate 63.

Based on the video signal (image data) received from the video signal processing portion 14, the LED controller 61 generates lighting control information for controlling the lighting of the LEDs 62. In the present example, the lighting control information is, for example, the information of 12 bits that determines the details (a duty ratio, a frequency and a phase or part of them) of a PWM signal related to the turning on and off of the LEDs 62. Although details are described later, the LED controller 61 feeds the clock signal (a signal having a pulse), a data signal (a signal carrying various types of information) and a mode signal (a signal for determining the state of the operation of each of the LED drivers 5), and thereby feeds the lighting control information to a previously enabled CH-specific processing portion 59. The mode signal is a signal that is either high or low and that is continuously fed, and the state of the operation of each of the CH-specific processing portions 59 is determined according to which state the mode signal is in.

Figure 9:
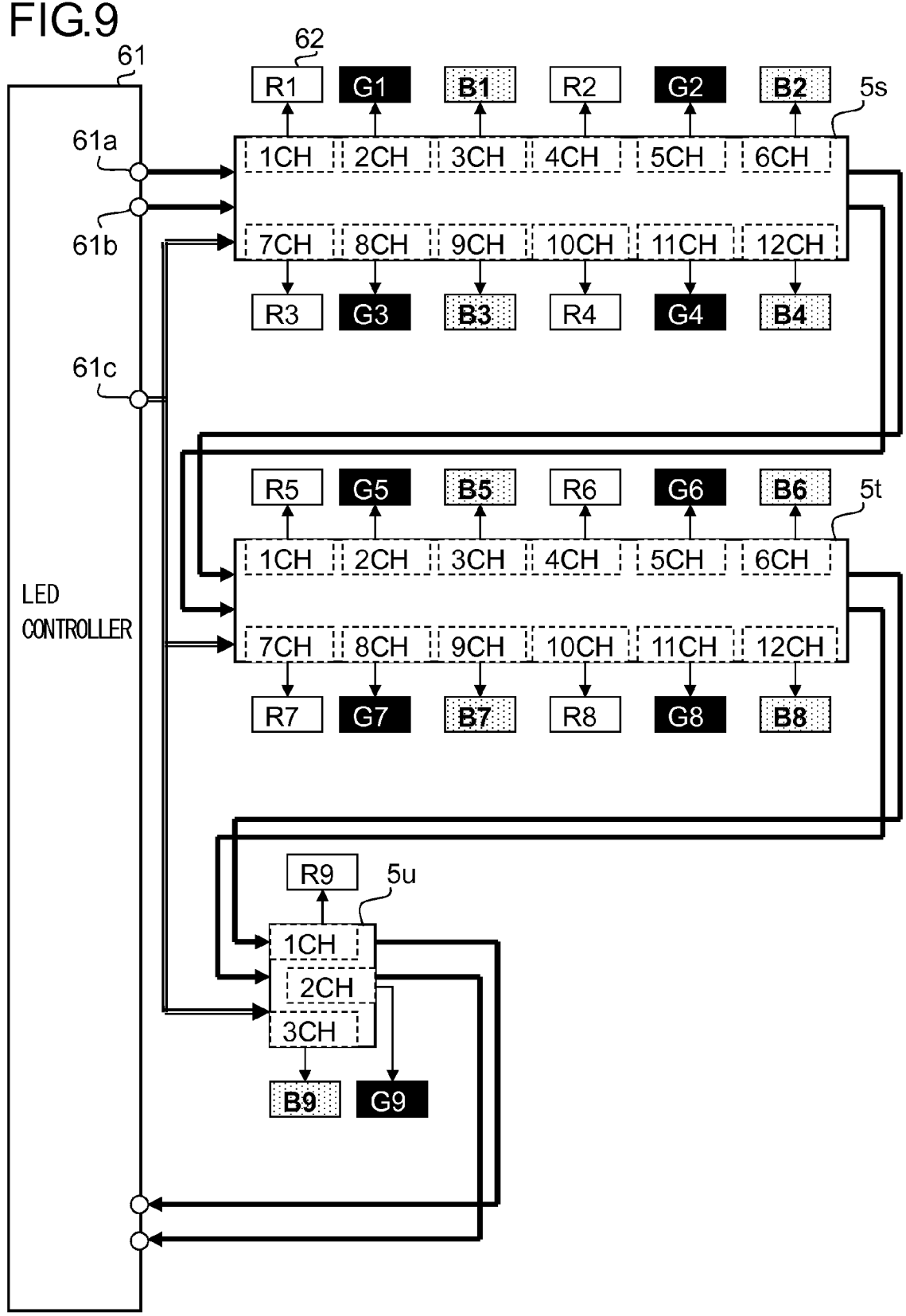
[FIG. 9] A diagram showing the configuration of a backlight unit according to a second example of the present invention.

The state of the connection of the individual portions of the backlight unit 16 is shown in FIG. 9. As shown in FIG. 9, the LED controller 61 includes the terminals (61a to 61c) for feeding various signals to the LED drivers 5. The clock signal, the data signal and the mode signal are fed through the terminal 61a, the terminal 61b and the terminal 61c, respectively.

As in the first example, the LED drivers 5 are connected in cascade between the terminal 61a and the terminal 61b. A signal transmission line that is related to the terminal 61a is referred to as a "first cascade line"; a signal transmission line that is related to the terminal 61b is referred to as a "second cascade line." Although details are described later, in each of the LED drivers 5, a plurality of CH-specific processing portions 59 are connected to the cascade line. When the CH-specific processing portions 59 in each of the LED drivers 5 are collectively seen, the CH-specific processing portion 59 that is arranged closer to the feeder of the signal (here, the LED controller 61) is referred to as the CH-specific processing portion 59 on the upstream side. The LED drivers 5 are directly connected to the terminal 61c.

The LED driver 5 has a plurality of control channels; one or a plurality of LEDs are connected to each of the control channels. Specifically, the LED driver 5s and the LED driver 5t each include twelve control channels (1 to 12 chs), and the LED driver 5u includes three control channels (1 to 3 chs). Then, the LED driver 5 turns on the LED 62 connected to each of the control channels according to the lighting control information that is previously and validly set for itself (in other words, that is stored in the data latch portion 56, which will be described later). The configuration of the LED driver 5 will now be described below.

Figure 10:
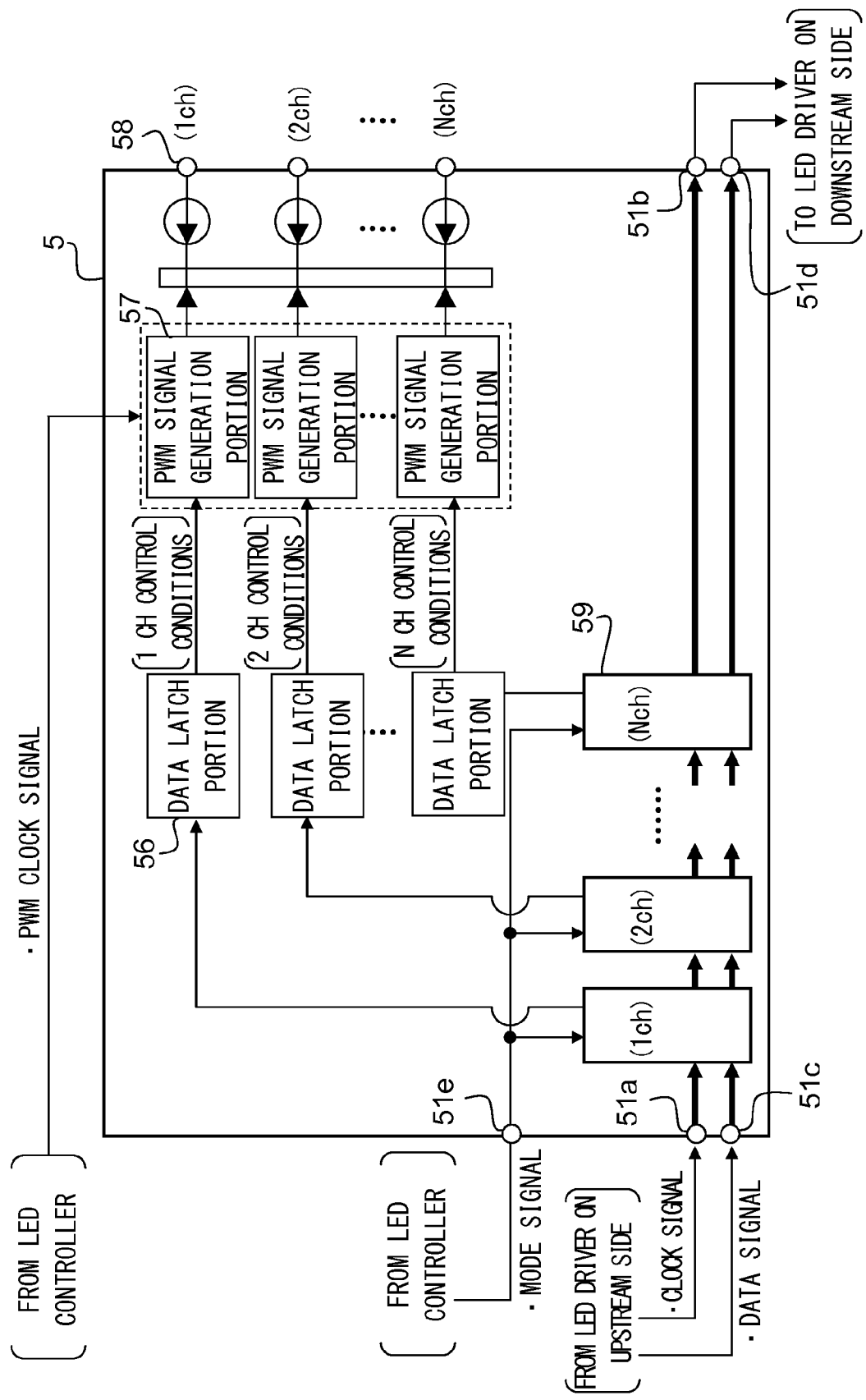
[FIG. 10] A diagram showing the configuration of an LED driver according to the second example of the present invention.

FIG. 10 is a diagram showing the configuration of the LED driver 5. As shown in this figure, the LED driver 5 includes terminals (51*a* to 51*e*) that are used for connection to other devices, the data latch portions 56, the PWM signal generation portions 57, the LED connection terminals 58 and the CH-specific processing portion 59. The portions (56 to 59) are provided according to the control channels of itself such that the portions for N systems (twelve systems for the LED driver 5*s* and the LED driver 5*t* and three systems for the LED driver 5*u*) are provided.

The terminal 51*a* is a terminal through which the clock signal is received from the outside. The terminal 51*a* is connected through the pulse monitoring portion 53 to the terminal 51*b*. Thus, the LED driver 5 receives the clock signal and then can transfer it to the outside through the terminal 51*b*.

In the present example, these terminals (51*a* and 51*b*) are used for the formation of the first cascade line. Specifically, the terminal 51*a* is connected to the terminal 51*b* of the LED driver 5 that is arranged closest to the upstream side. When the LED controller 61 is arranged closest to the upstream side, the terminal 51*a* is connected to the terminal 61*a*. The terminal 51*b* of the LED driver 5 at the most downstream position is connected to the LED controller 61 such that the signal is fed back.

The terminal 51*c* is a terminal through which the data signal is received from the outside. The terminal 51*c* is connected to the terminal 51*d*. Thus, the LED driver 5 receives the data signal, and then can transmit it to the outside through the terminal 51*d*.

In the present example, these terminals (51*c* and 51*d*) are used for the formation of the second cascade line described previously. Specifically, the terminal 51*c* is connected to the terminal 51*d* of the LED driver 5 that is arranged closest to the upstream side. When the LED controller 61 is arranged closest to the upstream side, the terminal 51*c* is connected to the terminal 61*b*. The terminal 51*d* of the LED driver 5 at the most downstream position is connected to the LED controller 61 such that the signal is fed back.

The terminal 51*e* is a terminal through which the mode signal is received from the outside. The terminal 51*e* is connected to the CH-specific processing portions 59. In the present example, the terminal 51*e* is connected to the terminal 61*c* of the LED controller 61. Thus, the CH-specific processing portion 59 (the portions 53 to 55 of the pulse monitoring portion 53) can receive the mode signal from the LED controller 61.

Figure 11:
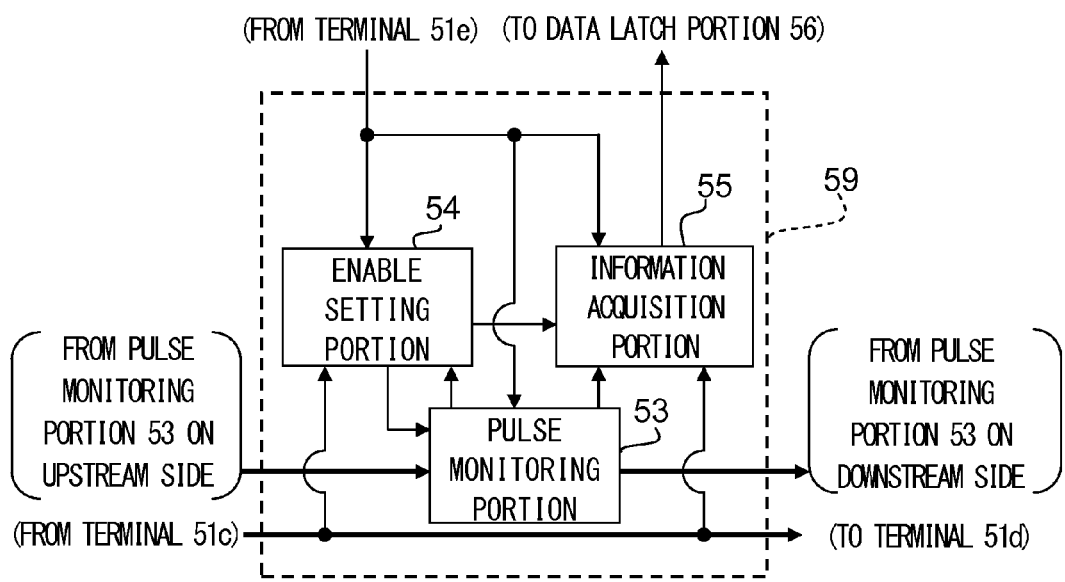
[FIG. 11] A diagram showing the configuration of a CH-specific processing portion according to the second example of the present invention.

The CH-specific processing portion 59 has the same functions as the information processing portion 52 of the first example, and is provided in each of the control channels of itself. As shown in FIG. 10, the CH-specific processing portions 59 are connected to the cascade lines; the CH-specific processing portions 59 corresponding to 1 to N chs are sequentially arranged from the upstream side to the downstream side. The configuration of the CH-specific processing portion 59 is shown in FIG. 11. As shown in this figure, the CH-specific processing portion 59 includes the pulse monitoring portion 53, the enable setting portion 54 and the information acquisition portion 55.

The pulse monitoring portion 53 is arranged between the pulse monitoring portion 53 (when itself is on the most upstream side, the terminal 51*a*) in the CH-specific processing portion 59 on the upstream side and the pulse monitoring portion 53 (when itself is on the most downstream side, the terminal 51*b*) in the CH-specific processing portion 59 on the downstream side, and monitors the clock signal transmitted from the upstream side. Each time the state of the mode signal is switched, the pulse monitoring portion 53 detects the first pulse (the pulse that is first reached after the state of the mode signal has been switched) of the clock signal, and notifies the enable setting portion 54 and the information acquisition portion 55 of the fact that the pulse has been reached.

The pulse monitoring portion 53 transfers the clock signal transmitted from the upstream side to the downstream side; here, the pulse monitoring portion 53 performs the processing (cancel processing) for cancelling the first pulse. However, as will be described later, only when the mode signal is low and is not enabled, the pulse monitoring portion 53 passes the transmitted clock signal to the downstream side without the transmitted clock signal being processed, and does not perform the cancel processing.

The pulse monitoring portion 53 includes a switch that switches the continuity and the discontinuity of the first cascade line. When the mode signal is switched, the pulse monitoring portion 53 brings the switch into the discontinuity state whereas, when the falling edge of the first pulse is detected, the pulse monitoring portion 53 brings the switch into the continuity state. In this way, the cancel processing described above is achieved. This is one example; another method may be employed.

The enable setting portion 54 sets enabled the CH-specific processing portion 59 corresponding to itself according to the transmitted enable information (at the state where the lighting control information can be acquired). The information acquisition portion 55 acquires the lighting control information transmitted from the upstream side, and feeds it to the data latch portion 56.

The data latch portion 56 stores (latches) the lighting control information. The lighting control information is reflected on the state of the lighting of the LED (that is, is set valid) by being stored in the data latch portion 56. When the data latch portion 56 receives the lighting control information from the information acquisition portion 55, the data latch portion 56 updates the currently stored lighting control information to the received lighting control information.

The PWM signal generation portion 57 uses a PWM clock signal transmitted from the LED controller 61, generates, according to the validly set lighting control information, the PWM signal (the signal that alternates between the high level and the low level at a predetermined duty ratio) and outputs it to the subsequent stage side of the corresponding system. In the present example, the PWM signal is generated according to a duty ratio indicated by the validly set lighting control information (such that a ratio between a time period of the high level and a time period of the low level is equal to the duty ratio). When the validly set lighting control information is updated, the generation of a PWM signal corresponding to a new piece of lighting control information is started after the update.

In the time period during which the PWM signal is high, a predetermined amount of current is passed through the LED connected to the LED connection terminal 58 of the corresponding control channel, and the LED is turned on (is lighted). On the other hand, in the time period during which the PWM signal is low, such current is not passed, and the LED connected to the LED connection terminal 58 of the corresponding control channel is turned off.

Within the rating of the LED driver 5, one or a plurality of LEDs can be connected to each of the LED connection terminals 58. The number of control channels, the system of various signals and the like are not limited to what have been described above; various forms thereof can be employed.

Although it is assumed that one LED driver 5 is formed as one IC chip, the LED driver 5 may be formed otherwise.

Figure 12:
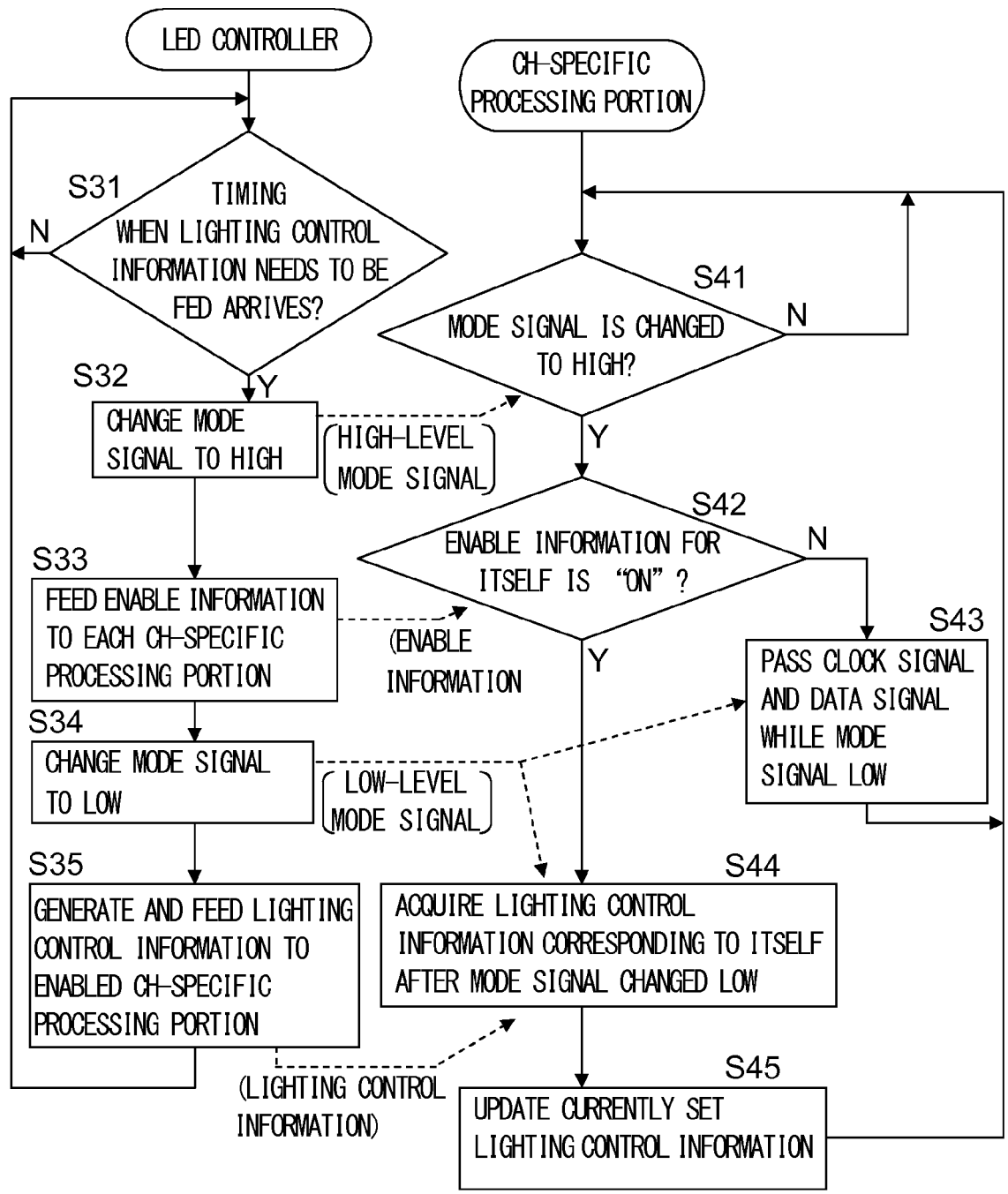
[FIG. 12] A flowchart of the operation of an LED controller and the like according to the second example of the present invention.

The details of the operation of the LED controller 61 and the details of the operation of the CH-specific processing portion 59 of each of the LED drivers 5 will now be described with reference to the flowchart shown in FIG. 12. Information indicating which one of the LEDs 62 is connected (corresponds) to each of the control channels of the LED drivers 5 and information indicating to which one of the sections each of the LEDs 62 corresponds are previously recorded in the LED controller 61.

The details of the operation of the LED controller 61 will first be described. The LED controller 61 monitors a timing when the LED controller 61 needs to feed the lighting control information to any one of the CH-specific processing portions 59 (control channels) (step S31). The method of determining a timing when the lighting control information needs to be fed will be described in more detail in a section titled "timing when the lighting control information is fed and the like", which will be described later. At this point, the LED controller 61 feeds a low level mode signal.

Then, if the arrival of the timing is detected (Y in step S31), the LED controller 61 sets high the mode signal being fed so as to switch the state of the operation of each of the CH-specific processing portions 59 (step S32).

Thereafter, the LED controller 61 selects, among the CH-specific processing portions 59, the CH-specific processing portion 59 in which the validly set lighting control information needs to be updated, and feeds the enable information for enabling the selected CH-specific processing portion 59 (step S33). More specifically, the LED controller 61 feeds: a clock signal which has pulses equal in number to the CH-specific processing portions 59 (the nth pulse as counted from the front corresponds to the nth CH-specific processing portion 59 as counted from the upstream side); and a data signal which is arranged such that the enable information (information indicating whether or not the CH-specific processing portion 59 is enabled) on the CH-specific processing portion 59 corresponding to each of the pulses is synchronized with the pulse.

The data signal here is either high or low; if the data signal is high, it indicates an "on" state (that it is enabled) whereas, if the data signal is low, it indicates an "off" state (that the LED driver 5 is not enabled).

Figure 13:
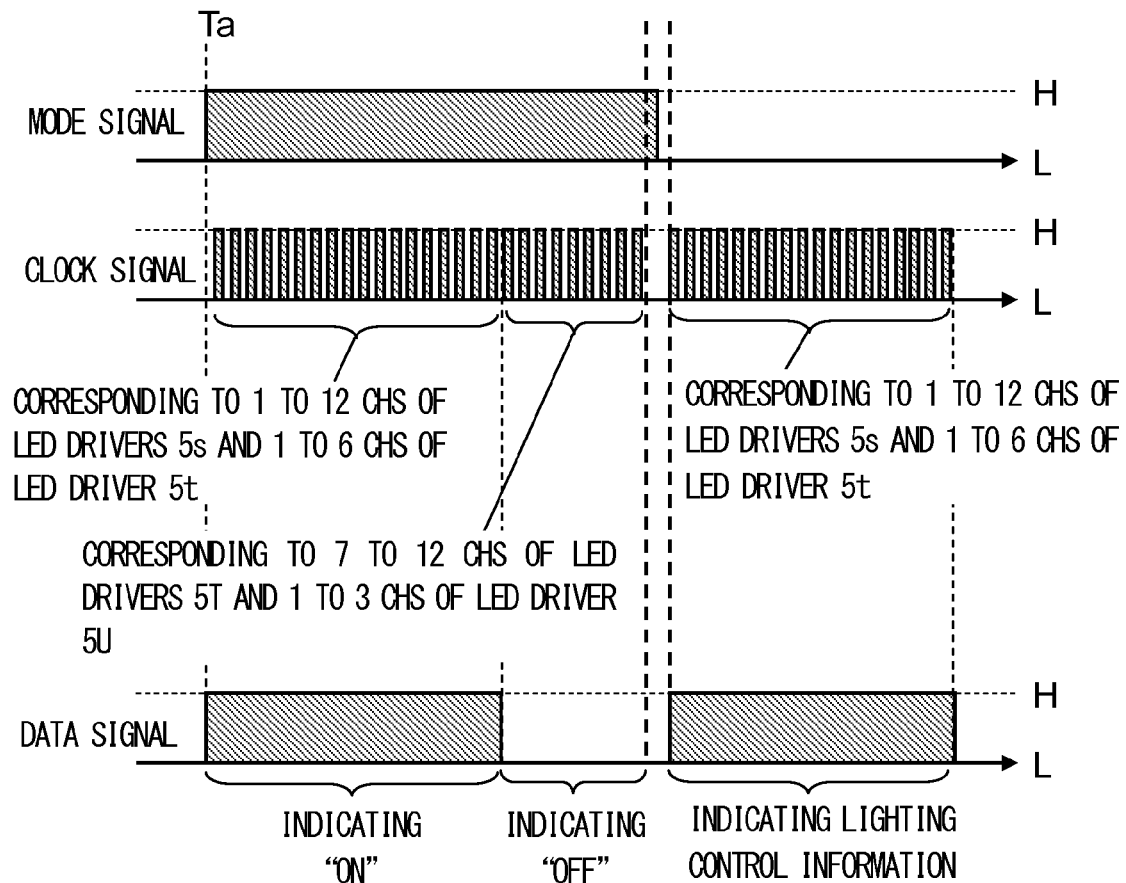
[FIG. 13] A timing chart of each signal in the second example of the present invention.

In one example, when it is assumed that the enable information for the first and second sections is "on", and that the enable information for the third section is "off", a timing chart on the clock signal and the data signal is shown in FIG. 13 (in a time period during which the mode signal is high). As shown in this figure, the clock signal has twenty seven pulses (corresponding in number to the CH-specific processing portions 59 over all the LED drivers 5), and part of the data signal that corresponds to the CH-specific processing portions 59 corresponding to the first and second sections is high, and the part of the data signal that corresponds to the other CH-specific processing portions 59 is low.

After the enable information is fed, the LED controller 61 sets low the mode signal output from the terminal 61c so as to switch the state of the operation of each of the CH-specific processing portions 59 (step S34). Then, the LED controller 61 generates and feeds the lighting control information to only the CH-specific processing portions 59 that have been enabled (in which the enable information is turned on) (step S35).

More specifically, the LED controller 61 feeds: a clock signal which has pulses equal in number to the enabled CH-specific processing portions 59 (the nth pulse as counted from the front corresponds to the nth enabled CH-specific processing portion 59 as counted from the upstream side); and a data signal which is arranged such that the lighting control information on the CH-specific processing portion 59 corresponding to each of the pulses is synchronized with the pulse.

It can also be considered that the data signal in this case indicates information (control information group) in which the lighting control information for the enabled CH-specific processing portions 59 is arranged, and that clock signal indicates information (correspondence information) indicating which part of the control information group corresponds to the lighting control information on each of the CH-specific processing portions 59.

A timing chart on the clock signal and the data signal here is shown in FIG. 13 (in the time period during which the mode signal is low). As shown in this figure, the clock signal has eighteen pulses (corresponding in number to the enabled CH-specific processing portions 59), and part of the data signal that synchronizes with each of the pulses indicates the lighting control information corresponding to the pulse.

After the lighting control information is fed, the operation of the LED controller 61 is returned to step S31, and then the same operations are repeated. Specifically, each time a timing when the lighting control information that is set validly for any one of the CH-specific processing portions 59 needs to be updated arrives, the operations in step S32 to S35 are repeated The details of the operation of the CH-specific processing portion 59 will now be described. The CH-specific processing portion 59 monitors a timing when the mode signal changes from low to high (step S41).

If the CH-specific processing portion 59 detects that the mode signal has changed to high (Y in step S41), the CH-specific processing portion 59 monitors the clock signal and the data signal (the enable information) transmitted from the upstream side, and performs an operation for setting itself enabled according to the enable information (step S42). More specifically, the enable setting portion 54 detects the state of a part (a notification of the timing when the first pulse arrives is provided by the pulse monitoring portion 53) that synchronizes with the first pulse in the data signal as seen from itself. Thus, it is possible to detect the enable information corresponding to itself.

Then, the enable setting portion 54 records the result of the detection until the mode signal is subsequently changed from low to high. Notification of the recorded information is provided to the pulse monitoring portion 53 and the information acquisition portion 55. In this way, if the enable information is "on" corresponding to itself, the CH-specific processing portion 59 is set enabled.

Then, if, when the mode signal is changed from high to low, it is not enabled (N in step S42), the information processing portion 52 passes the clock signal and the data signal while the mode signal is being low (step S43).

Specifically, although, while the mode signal is being low, the clock signal and the data signal for transmitting the lighting control information are transmitted (see step S15), the CH-specific processing portion 59 passes these signals to the downstream side without any processing (including the cancel processing described previously) being performed.

On the other hand, if, when the mode signal is changed from high to low, it is enabled (Y in step S42), the CH-specific processing portion 59 monitors the clock signal and the data signal transmitted from the upstream side, and performs an operation for acquiring the lighting control information corresponding to itself (step S44).

More specifically, the information acquisition portion 55 detects the state of the part (a notification of the timing when the first pulse arrives is provided by the pulse monitoring portion 53) that synchronizes with the first pulse in the data signal as seen from itself. Thus, the lighting control information corresponding to itself is detected Then, the information acquisition portion 55 records, the lighting control information acquired through the detection, in the data latch portion 56 (updates the details recorded) and updates the validly set lighting control information (step S45). Thus, each of the PWM signal generation portions 57 thereafter generates the PWM signal according to the updated lighting control information.

By performing a series of operations described above, the LED controller 61 generates and feeds the lighting control information, and can thereby control the lighting of the LED 62 connected to each of the LED drivers 5. Here, the target on which the generation and the feeding of the lighting control information are performed is only the enabled CH-specific processing portions 59.

Furthermore, the CH-specific processing portion 59 that performs an operation for acquiring the lighting control information is only the CH-specific processing portion 59 that is set enabled. As described above, in the backlight unit 16 of the present example, unnecessary operations on the generation, the feeding and the acquisition of the lighting control information are minimized. As described in the second example, the backlight unit 16 normally operates even when the LED drivers 5 (here, the LED driver having twelve control channels and the LED driver having three control channels) in which the number of control channels differs are present together in the backlight unit 16. In other words, when the backlight unit is designed, it is unnecessary to consider the number of control channels in the LED driver.

The CH-specific processing portion 59 includes an operation switch for switching the on/off state of the operation. When the operation switch is "on", the CH-specific processing portion 59 performs the operation described above whereas, when the operation switch is "off", the CH-specific processing portion 59 does not perform the operation described above (does not perform the cancel operation, either, and passes the clock signal).

In this way, when the LEDs are not connected to part or all of the control channels, the operation switches corresponding to theses control channels are turned "off", and thus it is possible to reduce unnecessary operations. When a predetermined signal is provided from the outside, the operation switch is switched. Alternatively, for example, the connection of the LEDs to the control channel is automatically determined, and the operation switch may be switched according to the result of this determination.

The feeding of the enable information and the lighting control information may be performed otherwise. With respect to the feeding of the enable information, for example, the LED controller 61 may feed, to one cascade line, information obtained by adding, to each piece of the enable information, address information (information that is used for distinguishing one of the CH-specific processing portions 59 from another and that is previously recorded in the LED controller 61). In this case, each of the CH-specific processing portions 59 can identify and acquire, from the address information, the enable information corresponding to itself. In this case, the cancel processing described previously is not needed. With respect to the feeding of the lighting control information, for example, the LED controller 61 may feed, to one cascade line, information obtained by adding the address information to each piece of the enable information. In this case, each of the CH-specific processing portions 59 can identify and acquire, from the address information, the lighting control information corresponding to itself. In this case, the cancel processing described previously is not needed, either.

[Timing When the Lighting Control Information is Fed and the Like]

As described above, when a timing when the lighting control information need to be fed to any one of the LED drivers 5 (or the CH-specific processing portions 59) arrives (see steps Si 1 and S31), the LED controller 61 of each of the examples generates and feeds necessary lighting control information (see steps S12 to S15 and S32 to S35). Here, an example of the timing when the lighting control information is fed and the like will be described below.

In the liquid crystal panel, it is preferable to turn on, as a group, backlights (LEDs) corresponding to one or a plurality of continuous rows (corresponding to the sections described previously), according to the state of the scanning of these rows (for example, with reference to a timing when the scanning is completed and then the adjustment of the transmittance of light in these rows is completed). This is because: as described above, the lighting of the backlights is controlled in units of one or a plurality of rows, and thus the effects of the insertion of a black screen are maintained as much as possible (while, apparently, the resolution of scanning is prevented as much as possible from being reduced), and it is easy to enhance the resolution of the displayed moving image.

Hence, in order to achieve the lighting of the backlights, the LED controller 61 feeds the lighting control information corresponding to the first section at a timing corresponding to the scanning of the first section (for example, a timing when a predetermined time period elapses after the scanning of all rows in the first section is completed). Likewise, the LED controller 61 feeds the lighting control information corresponding to the second section at a timing corresponding to the scanning of the second section, and feeds the lighting control information corresponding to the third section at a timing corresponding to the scanning of the third section.

As described previously, the video signal processing portion 14 continuously feeds, to the LED controller 61, synchronization signals and display clock signals (information that is part of the image data and that indicates a timing of the display of an image). Thus, the LED controller 61 can detect a timing when the scanning of each of the sections is completed and the like. Therefore, the LED controller 61 can monitor these signals and feed the lighting control information as described above.

Although, in each of the examples, the lighting control information determines the details of the PWM signal related to the lighting of the LED, the lighting control information may determine other information related to the lighting of the LED.

[Operation for Coping with the Decrease in the Number of LEDs]

In a backlight unit using LEDs, the necessary number of LEDs may be reduced as compared with the number of currently used LEDs as a result of, for example, the specifications of a product (for example, the reduction in the size of a display screen) being changed. In this case, in order for the number of steps in design and the like to be reduced, based on the backlight unit whose specifications have already been established (for example, the specifications on an LED mounting substrate, wiring and the like are used without being changed), part of LEDs that are provided therein is removed, and thus an attempt to produce a backlight unit having new specifications is likely to be made.

In this respect, the backlight unit 16 according to each of the examples described above is used, and thus it is possible to easily cope with the situation described above. The reason for this will be described below using a specific example.

Figure 14:
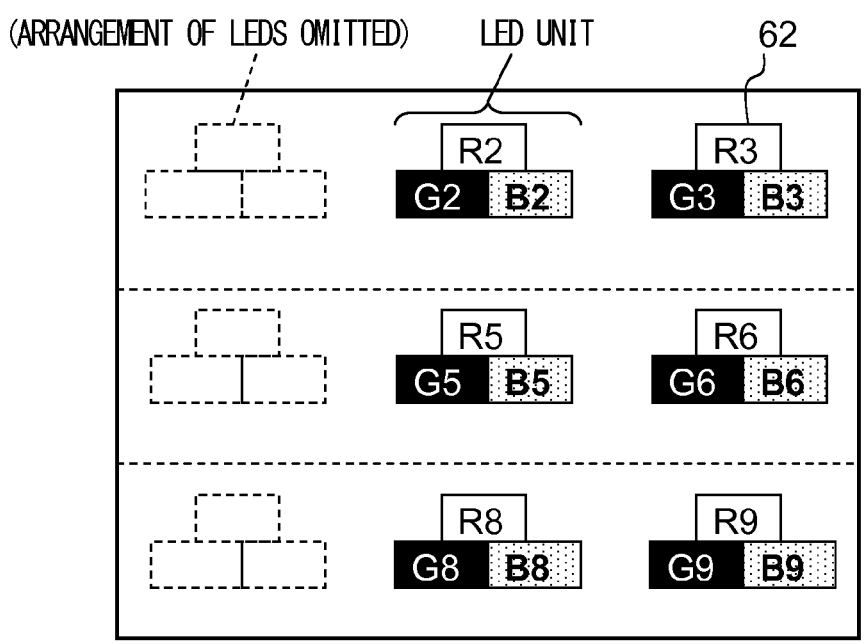
[FIG. 14] A diagram illustrating the arrangement of LEDs when part of the LEDs are removed.
Figure 15:
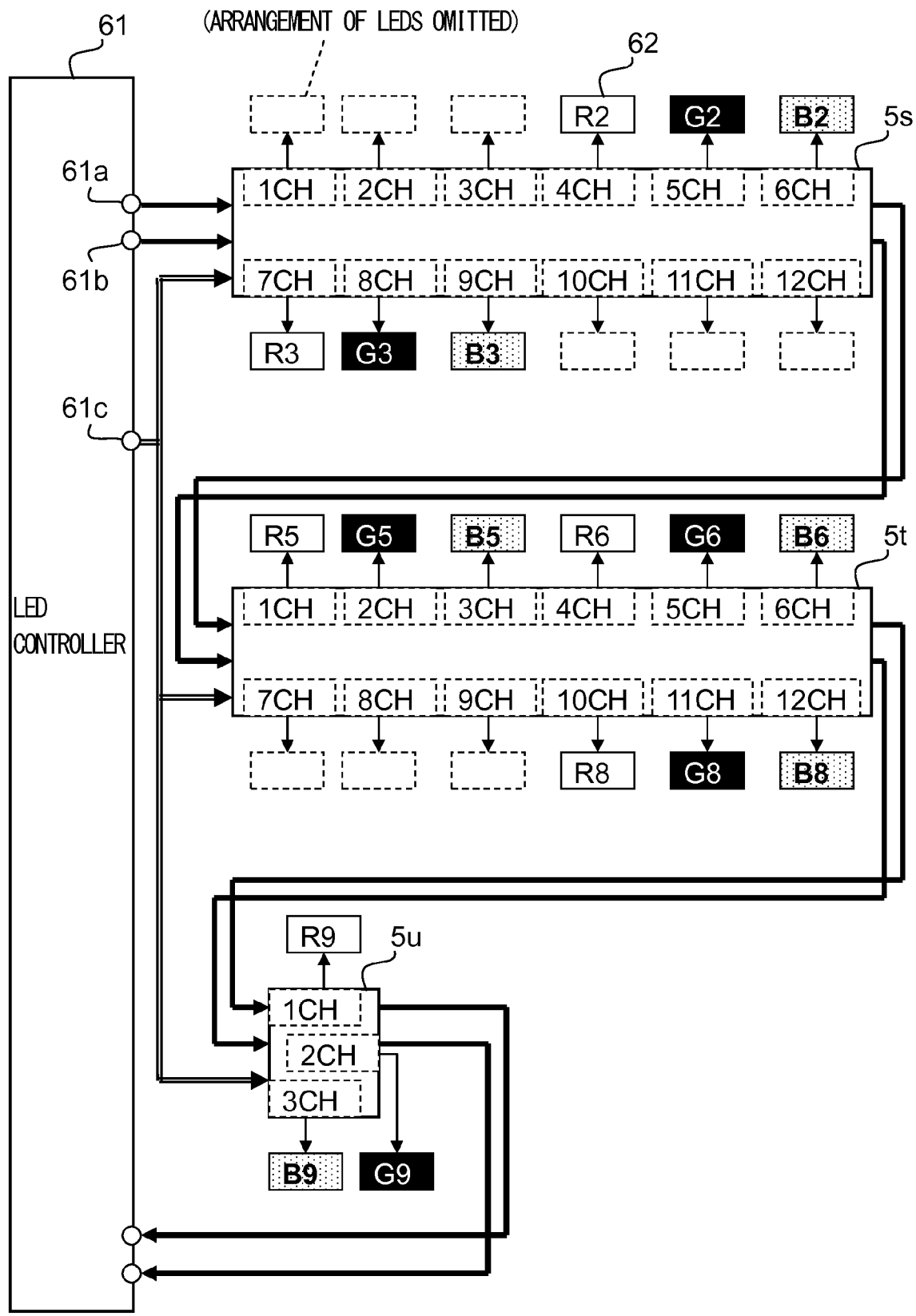
[FIG. 15] A diagram showing the configuration of a backlight unit when part of the LEDs are removed.

In this example, it is assumed that, based on the backlight unit 16 according to the second example (where the LEDs are arranged as shown in FIG. 5; referred to as a "current specification product" for convenience), a backlight unit whose LED units on the left side of each of the sections (the LEDs 62 represented by R1, G1, B1, R4, G4, B4, R7, G7 and B7) are removed is produced (where the LEDs are arranged as shown in FIG. 14; referred to as a "new specification product" for convenience). The connection of the individual portions in the new specification product is shown in FIG. 15.

In this case, the new specification product is provided only by omitting the arrangement of the LED units on the left side of each of the sections and making relatively simple changes on the LED controller 61 and the LED drivers 5. The change made in the LED controller 61 is to prevent the enable information and the lighting control information from being fed to the control channels corresponding to the omitted LEDs. For example, among pieces of information on the LEDs and the control channels registered in the LED controller 61, the information on the omitted LEDs is removed. With respect to the LED drivers 5, the operation switches of the CH-specific processing portions 59 in the control channels corresponding to the omitted LEDs are set "off."

With the new specification product, the same operations as with the current specification product (specifically, the operations in steps S31 to S35 and S41 to S45) are performed, and thus it is possible to control the state of the lighting of the LEDs. For example, as shown in the timing chart of FIG. 7, in the case where the LEDs 62 are turned on, the timing chart on the mode signal, the clock signal and the data signal is shown in FIG. 16.

Figure 16:
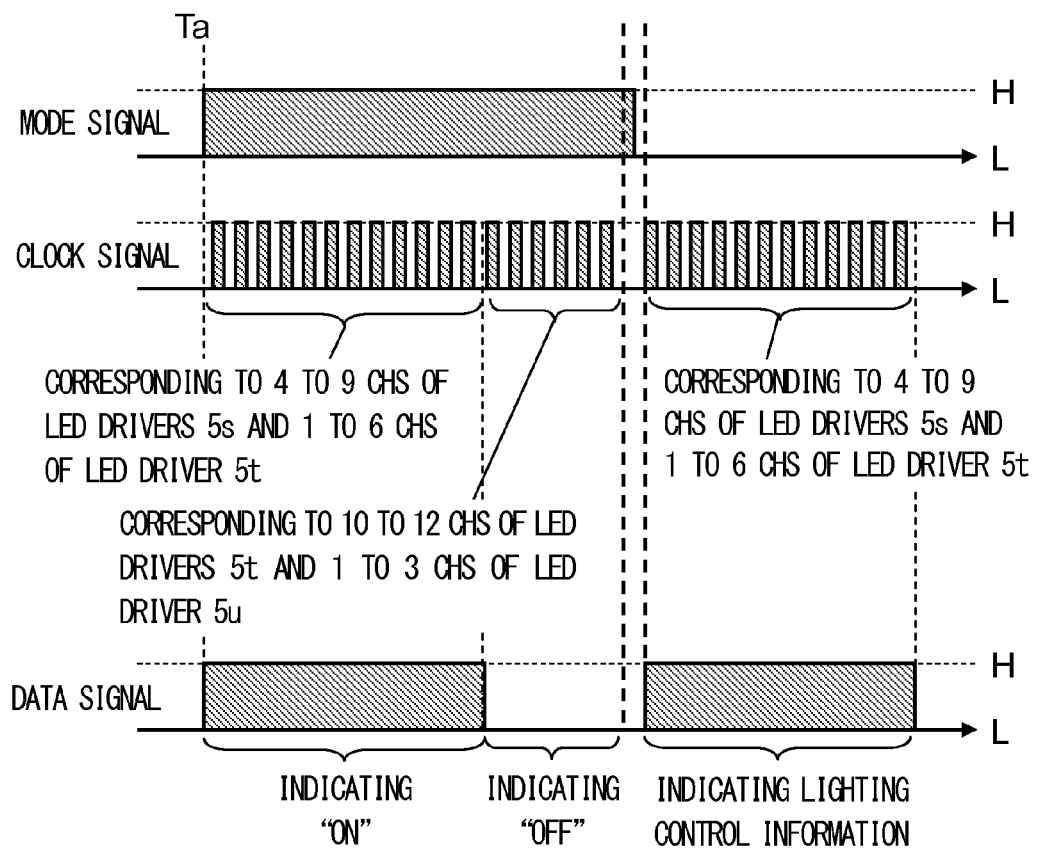
[FIG. 16] A timing chart of each signal when part of the LEDs are removed.

As shown in FIG. 16, when a timing Ta arrives (Y in step S11), the mode signal becomes high (step S12), and the enable information (the clock signal and the data signal) is fed (step S13). Here, the clock signal includes pulses corresponding to only the control channels to which the LEDs are connected and does not include pulses corresponding to the control channels to which the LEDs are not connected. The data signal becomes high in synchronization with the pulses corresponding to the first section and the second section and to the control channels (4 to 9 chs of the LED driver 5s and 1 to 6 chs of the LED driver 5t) to which the LEDs are connected or becomes low in synchronization with the other pulses.

Thereafter, the mode signal becomes low (step S14), and the lighting control information (the clock signal and the data signal) is fed (step S15). Here, the clock signal includes pulses corresponding to only the enabled control channels to which the LEDs are connected and does not include pulses corresponding to the control channels to which the LEDs are not connected. The data signal becomes high in synchronization with the pulses corresponding to the first section and to the control channels (4 to 9 chs of the LED driver 5s) to which the LEDs are connected or becomes low in synchronization with the other pulses.

On the other hand, the CH-specific processing portions 59 whose operation switches are "off", in each of the LED drivers 5, constantly pass the clock signals. Hence, as seen from each of the CH-specific processing portions 59 whose operation switches are "on", at a timing when the pulse arrives at itself, the data signal indicates the enable information and the lighting control information corresponding to itself. Thus, each of the CH-specific processing portions 59 can appropriately acquire the enable information and the lighting control information, and can therefore update the set lighting control information properly (according to an instruction from the LED controller 61).

Figure 17:
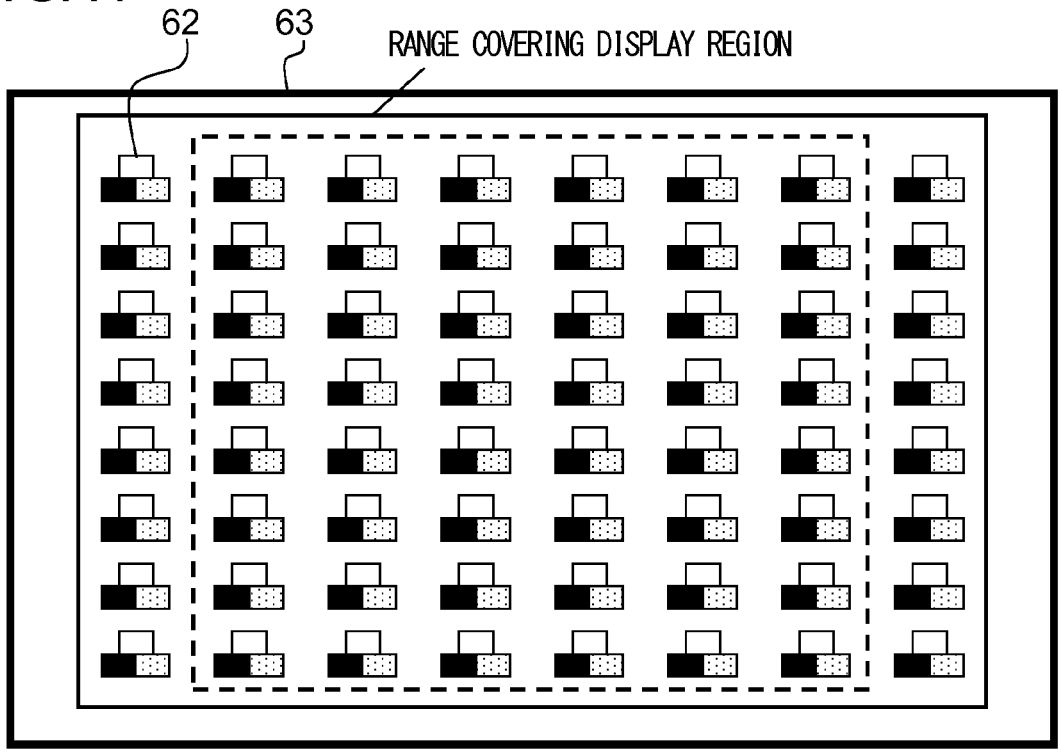
[FIG. 17] A diagram illustrating the arrangement of LEDs in an example of current specifications.

Here, another variation (in the case where uneven pitches are present) of the arrangement of the LEDs when the new specification product is produced based on the current specification product will be described with reference to FIGS. 17 and 18. FIG. 17 shows the state of the arrangement of the LEDs in the current specification product. As shown in FIG. 17, in the current specification product, in order to evenly supply the backlight over the entire display region of the liquid crystal panel 15a, the LEDs are arranged to cover the entire range covering the display region of the LED mounting substrate 63.

Under these conditions, in the new specification product, the range covering the display region of the LED mounting substrate 63 is a range indicated by broken lines of FIG. 17. In this case, since the LED units in the one row on each of both ends, that is, the left and right ends little contribute to the supply of the backlight to the display region, these LED units are not necessary.

Figure 18:
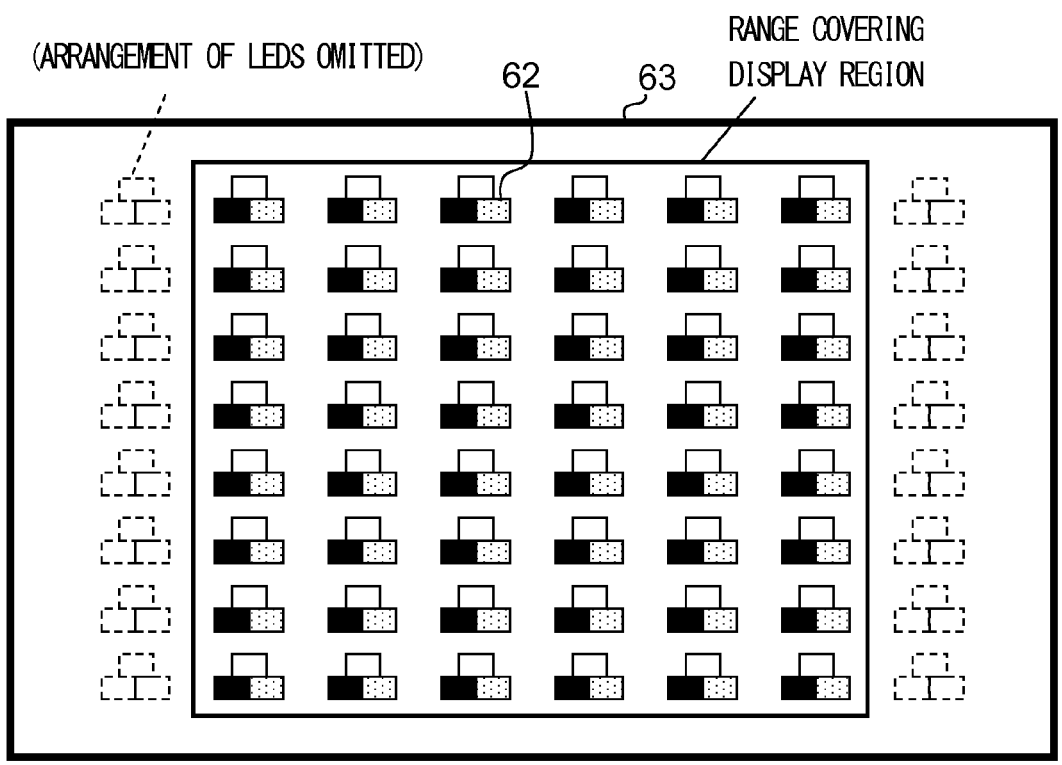
[FIG. 18] A diagram illustrating the arrangement of LEDs in an example of new specifications.

Hence, in this case, the state of the arrangement of the LEDs in the new specification is changed to the state as shown in FIG. 18. Specifically, the arrangement of the LED units in the one row on each of both ends, that is, the left and right ends is omitted, and the total number of LEDs is reduced. Thus, it is possible to provide the new specification product by using the LED mounting substrate 63 of the current specification product without unnecessary LEDs being produced. As described previously, even in the new specification product produced as described above, as in the current specification product, it is possible to reduce the unnecessary operation of feeding the lighting control information (such as dummy data) on the omitted LEDs.

[Conclusions]

As described above, the television broadcast receiver 1 according to each of the examples includes the liquid crystal panel unit 15 and the backlight unit 16 and the functional portion (the individual portions from the control portion 10 to the video signal processing portion 14) that acquires and supplies the image data to these units (15 and 16).

A plurality of LEDs 62 and one or a plurality of LEDs 62 are connected to the backlight unit 16 of the first example; the backlight unit 16 includes a plurality of LED drivers 5 that turn on the connected LEDs 62 according to the obtained lighting control information. The backlight unit 16 also includes: the LED controller 16 (lighting control portion) that selects any of the LED drivers 5 (see step S11) and that generates the data signal (control information group) in which the lighting control information on the selected LED drivers 5 is arranged; and the cascade lines (the first and second cascade lines) that connect the LED drivers 5 to the backlight unit 16 in cascade.

The LED controller 16 enables the selected LED drivers 5 (see steps S12 and S13), and then feeds the data signal, the clock signal (the correspondence information) indicting which part of the data signal corresponds to the lighting control information on the LED drivers 5 and the cascade lines (see steps S14 and S15).

When each of the LED drivers 5 is enabled, the LED driver performs the operation (acquisition operation) of acquiring, according to the clock signal, the lighting control information on itself from the data signal (see step S23) whereas, when each of the LED drivers 5 is not enabled, the LED driver does not perform the acquisition operation (see step S25).

Hence, with the backlight unit 16, as compared with the case where the lighting control information is fed in parallel to the LED drivers, it is possible to minimize the number of necessary signal transmission lines and the number of necessary terminals needed for the formation of the signal transmission lines. Hence, it is easier to provide the device for handing the lighting control information than it is provided by an ASIC.

Furthermore, with the backlight unit 16, it is possible to reduce the performance of the unnecessary operations (such as the operation of producing and feeding the lighting control information to the LED drivers that are not enabled and the operation of acquiring the lighting control information by the LED drivers that are not enabled).

In the backlight unit 16 according to the second example, each of the LED drivers 5 is provided with, in each of the control channels, the CH-specific processing portion 59 having substantially the same functions as the information processing portion 52 of the first example. Thus, it is possible not only to allocate the lighting control information to each of the control channels but also to have advantages according to the first example.

With the backlight unit 16 according to the second example, it is possible to adjust the state of the lighting in each of the control channels. Thus, it is possible to further reduce the production of the control channels (the remainder of the control channels) that are not needed because the state of the lighting thereof cannot be freely adjusted.

For reference sake, the numbers of LED drivers and control channels needed when the lighting of the backlight in which the LEDs are arranged in 20 lines (rows) ×10 columns (hence, the total number is 200) is controlled independently on an individual line basis (that is, the lighting control information is given independently on an individual line basis) will be described with reference to FIG. 19. Here, each of the LED drivers has 16 control channels; one LED can be connected to each of the control channels.

When a normal LED driver (in which the lighting control information cannot be allocated to each of the control channels) is applied, as shown in the top section of FIG. 19, one LED driver cannot handle a plurality of lines. Hence, two LED drivers are needed in each line, that is, the total of twenty LED drivers (two×10 lines) are needed. Since, in each line, twelve control channels are left, the total of 120 (twelve×10 lines) control channels are left.

On the other hand, when the LED driver according to the second example of the present invention (in which the lighting control information can be allocated to each of the control channels) is applied, as shown in the lower section of FIG. 19, one LED driver can handle a plurality of lines. Hence, the number of necessary LED drivers is thirteen (calculated from 200/16 chs=12.5), and the remainder of the control channels is reduced to eight (13×16 chs−200).

In the LED driver according to the second example, in terms of the flexibility of the LED control, it is preferable to independently set the lighting control information in each of the control channels; the present invention is not necessarily limited to this setting. For example, among 1 to 12 ch control channels, the same lighting control information may be used for 1 to 3 chs; likewise, the same lighting control information may be used for 4 to 6 chs, 7 to 9 chs and 10 to 12 chs. Even with this configuration, it is possible to obtain the effects according to the LED drivers of the second example.

Although, in each of the examples, the LED is used as the light source of the backlight, another light-emitting element (for example, an organic EL or a semiconductor laser) may be used. In this case, in the backlight unit 16, instead of the LED driver 5, a driver device (whose basic configuration is the same as the LED driver 5) for turning on the another light-emitting element is preferably used. Although, as the LED that is the light source of the backlight, the LED of each of the RGB colors is applied, even when a W-LED (LED itself emits white light) is applied, it is possible to consider in the same manner.

The feeding of the enable information and the lighting control information by the LED controller 61 is realized by the feeding of the data signal indicating each piece of information and the clock signal indicating a correlation between each part of the data signal and each destination (the information processing portion 52 or the CH-specific processing portion 59). Hence, as seen from each of the destinations, the detection of only information on itself can be realized by a simple operation. However, the feeding of the enable information and the lighting control information may be performed otherwise.

As signals that are fed from the LED controller 61 to the LED drivers 5, various types of signals described above, a signal indicating a timing when the lighting control information is latched in the data latch portion 56 and the like may be set. When an error on the acquisition of the lighting control information occurs in each of the LED drivers 5, a signal indicating the occurrence of the error may be transmitted to the LED controller 61.

Although the embodiment of the present invention has been described above, the present invention is not limited to the details described above. The technical matters described in the examples can be combined together and used unless a contradiction arises. Many modifications are possible in the embodiment of the present invention without departing from the spirit of the present invention.

Industriol Applicability

The present invention can be utilized in an image display device for displaying an image with backlight.

LIST OF REFERENCE SYMBOLS

1 Television broadcast receiver (image display device)
5 LED driver (driver device)
10 Control portion
11 Operation portion
12 Broadcast reception portion
13 Broadcast signal processing portion
14 Video signal processing portion
15 Liquid crystal panel unit
15*a* Liquid crystal panel (panel)
15*b* Panel driver
16 Backlight unit
61 LED controller
61*a* to 61*c* Terminals provided in the LED controller
62 LED (light-emitting element)
63 LED mounting substrate
51*a* to 51*e* Terminals provided in the LED driver
52 Information processing portion
53 Pulse monitoring portion
54 Enable setting portion
55 Information acquisition portion
56 Data latch portion
57 PWM signal generation portion
58 LED connection terminal
59 CH-specific processing portion (CH-specific information acquisition portion)

The invention claimed is:

1. A backlight unit including:
a plurality of light-emitting elements; and
a driver device to which at least one of the plurality of light-emitting elements is connected and which turns on the at least one of the plurality of light-emitting elements according to lighting control information, wherein
the backlight unit is configured to turn on the at least one of the plurality of light-emitting elements to supply backlight to a panel configured to display an image,
the backlight unit further comprising:
a plurality of the driver devices;
a lighting control portion configured to perform a selection operation to select any of the driver devices, and generate a control information group where the lighting control information on the selected driver devices is arranged; and
a cascade line over which the driver devices are connected in cascade to the lighting control portion, wherein
the lighting control portion is configured to enable each of the selected driver devices and then feeds, to the cascade line, the control information group and correspondence information indicating which portion of the control information group corresponds to the lighting control information on each of the driver devices,
each of the enabled driver devices performs an acquisition operation to acquire, according to the correspondence information, the lighting control information on the enabled driver device from the control information group whereas each of the driver devices that are not enabled does not perform the acquisition operation, and
the driver devices are configured to be independently selectable such that any number of the driver devices are selected or unselected in the selection operation.

2. The backlight unit of claim 1,
wherein the lighting control portion sequentially sets an operation mode of each of the driver devices at a first mode and a second mode,
in a time period during which the first mode is set, the lighting control portion feeds, to the cascade line, enable information for enabling only the selected driver devices among driver devices,
in a time period during which the second mode is set, the lighting control portion feeds, to the cascade line, the control information group and the correspondence information,
in the time period during which the first mode is set, each of the driver devices enables the driver device according to the enable information fed to the cascade line, and
in the time period during which the second mode is set, when each of the driver devices is enabled, each of the driver devices performs the acquisition operation whereas, when each of the driver devices is not enabled, each of the driver devices does not perform the acquisition operation.

3. The backlight unit of claim 2,
wherein, in the time period during which the first mode is set, the lighting control portion feeds, as the enable information, to the cascade line: a clock signal having pulses (sequentially from the front thereof, that correspond to the driver devices closer to an upstream side) corresponding to the driver devices; and a data signal in which information indicating whether or not the driver devices corresponding to the pulses are enabled is arranged to synchronize with the pulses, and
each of the driver devices detects a state of a part of the data signal that synchronizes with a first pulse as seen from the driver device, and performs, according to a result of the detection, an operation of enabling the driver device and an operation of cancelling the first pulse.

4. The backlight unit of claim 2,
wherein, in the time period during which the second mode is set, the lighting control portion feeds, as the control information group and identification information, to the cascade line: a clock signal having pulses (sequentially from the front thereof, that correspond to the driver devices closer to the upstream side) corresponding to the enabled driver devices; and a data signal in which the lighting control information on the driver devices corresponding to the pulses is arranged to synchronize with the pulses,
each of the enabled driver devices performs the acquisition operation including an operation of detecting a state of a part of the data signal that synchronizes with a first pulse as seen from the enabled driver device, and an operation of cancelling the first pulse, and
each of the driver devices that are not enabled performs neither the acquisition operation nor the cancel operation.

5. The backlight unit of claim 1,
wherein the light-emitting elements are LEDs.

6. An image display device comprising:
the backlight unit of claim 1;
a panel unit that includes the panel and that uses the backlight to display an image corresponding to received image data on the panel; and
an image data supply portion that acquires the image data and that supplies the image data to the backlight unit and the panel unit,
wherein the lighting control portion performs the selection operation based on the image data received from the image data supply portion.

7. A driver device to which one or a plurality of light-emitting elements are connected and which turns on the connected light-emitting elements according to lighting control information obtained,
the driver device comprising:
a mode setting portion which sets, according to the obtained information, an operation mode of the driver device at a first mode or a second mode; and
a cascade connection portion which connects the driver device to an external device in cascade, which receives a clock signal and a data signal from an upstream side and which feeds these signals to a downstream side,
wherein, in a time period during which the first mode is set, the driver device detects a state of a part of the data signal that synchronizes with a first pulse as seen from the driver device, and performs, according to a result of the detection, an operation of enabling the driver device and an operation of cancelling the first pulse, and
in a time period during which the second mode is set, when the driver device is enabled, the enabled driver device performs an acquisition operation of detecting a state of a part of the data signal that synchronizes with the first pulse as seen from the enabled driver device and of acquiring the lighting control information on the enabled driver device, and an operation of cancelling the first pulse whereas, when the driver device is not enabled, the driver devices performs neither the acquisition operation nor the cancel operation.

8. The backlight unit of claim 7, wherein the light-emitting elements are LEDs.

* * * * *